United States Patent
Yu

(10) Patent No.: US 10,524,263 B2
(45) Date of Patent: Dec. 31, 2019

(54) APPARATUS AND METHOD FOR DETERMINING SUBBAND RESOURCE

(71) Applicant: Huawei Technologies Co., Ltd., Shenzhen (CN)

(72) Inventor: Zheng Yu, Beijing (CN)

(73) Assignee: Huawai Technologies Co., Ltd., Shenzhen (CN)

( * ) Notice: Subject to any disclaimer, the term of this patent is extended or adjusted under 35 U.S.C. 154(b) by 148 days.

(21) Appl. No.: 15/660,570

(22) Filed: Jul. 26, 2017

(65) Prior Publication Data
US 2017/0325236 A1 Nov. 9, 2017

Related U.S. Application Data

(63) Continuation of application No. PCT/CN2015/087069, filed on Aug. 14, 2015.

(30) Foreign Application Priority Data

Jan. 30, 2015 (WO) ................ PCT/CN2015/072036

(51) Int. Cl.
*H04W 72/04* (2009.01)
*H04L 27/26* (2006.01)
(Continued)

(52) U.S. Cl.
CPC ......... *H04W 72/0453* (2013.01); *H04L 5/003* (2013.01); *H04L 5/0064* (2013.01);
(Continued)

(58) Field of Classification Search
CPC .................. H04W 72/0453; H04W 72/0446
See application file for complete search history.

(56) References Cited

U.S. PATENT DOCUMENTS

| 2010/0136997 A1* | 6/2010 | Palanki | H04W 88/02 |
| | | | 455/452.1 |
| 2011/0034198 A1* | 2/2011 | Chen | H04L 1/0029 |
| | | | 455/509 |

(Continued)

FOREIGN PATENT DOCUMENTS

| CN | 101834824 A | 9/2010 |
| CN | 102781094 A | 11/2012 |

(Continued)

OTHER PUBLICATIONS

"3rd Generation Partnership Project; Technical Specification Group Radio Access Network; Evolved Universal Terrestrial Radio Access (E-UTRA); Physical channels and modulation (Release 12)," 3GPP TS 36.211, V12.4.0, pp. 1-124, 3rd Generation Partnership Project, Valbonne, France (Dec. 2014).

(Continued)

*Primary Examiner* — Hoon J Chung
(74) *Attorney, Agent, or Firm* — Leydig, Voit & Mayer, Ltd.

(57) ABSTRACT

The present invention discloses an apparatus and a method for determining a subband resource and relates to the field of communications network technologies, so as to resolve a problem of how to ensure communication between user equipment and a base station while costs of the UE or complexity of the UE is reduced. In embodiments of the present invention, subband resource information acquired by UE is used to determine a subband resource, so that data and/or control information can be transmitted according to the subband resource. The solutions provided in the embodiments of the present invention are suitable to be used to determine a subband resource.

12 Claims, 14 Drawing Sheets

(51) Int. Cl.
*H04W 72/08* (2009.01)
*H04L 5/00* (2006.01)
*H04W 4/70* (2018.01)

(52) U.S. Cl.
CPC .......... *H04L 5/0091* (2013.01); *H04L 5/0094* (2013.01); *H04L 27/2621* (2013.01); *H04W 4/70* (2018.02); *H04W 72/0446* (2013.01); *H04W 72/085* (2013.01); *H04L 5/0098* (2013.01); *H04W 72/042* (2013.01); *H04W 72/0413* (2013.01); *H04W 72/082* (2013.01)

(56) References Cited

U.S. PATENT DOCUMENTS

2012/0163223 A1* 6/2012 Lo .................. H04L 5/0007
  370/252

2014/0247781 A1 9/2014 Somasundaram et al.

FOREIGN PATENT DOCUMENTS

| CN | 103220796 A | 7/2013 |
| CN | 103517439 A | 1/2014 |
| WO | WO 2013173673 A2 | 11/2013 |
| WO | 2013189201 A1 | 12/2013 |
| WO | WO 2014053067 A1 | 4/2014 |

OTHER PUBLICATIONS

"On the specification and use of narrowbands," 3GPP TSG RAN WG1 Meeting #81, R1-152446,Fukuoka, Japan pp. 1-5, 3rd Generation Partnership Project—Valbonne, France (May 25-29, 2015).

* cited by examiner

APPARATUS AND METHOD FOR DETERMINING SUBBAND RESOURCE

CROSS-REFERENCE TO RELATED APPLICATIONS

This application is a continuation of International Application No. PCT/CN2015/087069, filed on Aug. 14, 2015, which claims priority to International Application No. PCT/CN2015/072036, filed on Jan. 30, 2015. The disclosures of the aforementioned applications are hereby incorporated by reference in their entireties.

TECHNICAL FIELD

The present invention relates to the field of communications network technologies, and in particular, to an apparatus and a method for determining a subband resource.

BACKGROUND

In a current communications system, a base station and user equipment (UE) perform information communication on a carrier. A frequency width of the carrier (carrier bandwidth for short) may be referred to as a channel bandwidth or a transmission bandwidth or a system bandwidth or a bandwidth. For UE having a normal capability, the UE may receive data within an entire system bandwidth.

In communication on the Internet of Things, various devices having specified sensing, computation, execution, and communication capabilities are deployed, and a network is used to implement information transmission, coordination, and processing functions, thereby implementing interconnections between people and things and between things. To reduce a cost, low-complexity (and/or low-cost, and/or low-power-consumption, and/or coverage-enhanced) UE is particularly suitable for communication on Internet of Things or machine type communication (MTC).

However, low-complexity UE can send or receive only data and/or control information within an operating bandwidth (the operating bandwidth is less than a carrier bandwidth, for example, the bandwidth is 20 MHz, and the operating bandwidth is 200 KHz, 1.4 MHz, 3 MHz, 5 MHz, or the like) on a carrier, and the low-complexity UE cannot know which part of operating bandwidth in the bandwidth is a bandwidth used to transmit data and/or control information. Therefore, communication between the low-complexity UE and a base station is impeded.

SUMMARY

Embodiments of the present invention provide a method and an apparatus for determining a subband resource, so as to resolve a problem of how to ensure communication between user equipment and a base station while costs of the UE or complexity of the UE is reduced.

According to a first aspect, an embodiment of the present invention provides an apparatus for determining a subband resource, where the apparatus is applied to user equipment UE, the subband resource is a resource in a subband, the subband is a frequency resource that is in a bandwidth and that has an operating bandwidth, the bandwidth is a downlink bandwidth or an uplink bandwidth, the operating bandwidth is less than the bandwidth, and the apparatus includes:

an acquiring module, configured to: acquire subband resource information, and provide the subband resource information to a determining module, where the subband resource information includes information for determining a subband resource;

the determining module, configured to: determine the subband resource according to the subband resource information, and provide the subband resource to a transmission module; and the transmission module, configured to transmit data and/or control information according to the subband resource.

With reference to the first aspect, in a first possible embodiment, the subband resource is the subband, or the subband resource is a center subcarrier of the subband.

With reference to the first aspect or the first possible embodiment of the first aspect, in a second possible embodiment, the subband resource information includes particular frequency information and a first offset parameter, where the particular frequency information is used to determine the center subcarrier of the subband, and the first offset parameter is used to determine an offset of the center subcarrier of the subband; or the subband resource information includes a first parameter and a second parameter, where the first parameter is used to determine a location of the center subcarrier of the subband in a resource block RB, and the second parameter is used to determine the resource block RB in which the center subcarrier of the subband is located; or the subband resource information includes a subband determining manner and a subband index, where the subband determining manner specifies a formation manner of the subband in the bandwidth, and the subband index is a number of the subband in the bandwidth.

With reference to the second possible embodiment of the first aspect, in a third possible embodiment, when the subband resource information includes the particular frequency information and the first offset parameter, the particular frequency information is one or more of a center frequency of a center subcarrier of a carrier, a center subcarrier of a carrier, a subcarrier index of a center subcarrier of a carrier, a particular subcarrier of a carrier, an index of a particular subcarrier of a carrier, a particular resource block in a carrier, an index of a particular resource block in a carrier, a particular frequency in a carrier, a location of a particular frequency in a carrier, or a particular frequency resource in a carrier; and the first offset parameter indicates one or more of a subcarrier quantity of a first offset, a value of a frequency of a first offset, or a resource block quantity of a first offset.

With reference to the third possible embodiment of the first aspect, in a fourth possible embodiment, the determining module is further configured to: when a quantity of resource blocks included in the bandwidth is an odd number, determine the subband resource according to the particular frequency information, the first offset parameter, and a second offset parameter, where the subband resource information further includes the second offset parameter, the second offset parameter indicates that a second offset is N subcarriers or a frequency resource width of N subcarriers, and N is an integer not equal to 0.

With reference to the fourth possible embodiment of the first aspect, in a fifth possible embodiment, the apparatus further includes a receiving module, where the receiving module is configured to: receive first signaling sent by a base station, and provide the first signaling to the determining module, where the first signaling is used to: indicate a first particular manner of determining the subband resource by using the particular frequency information and the first offset, where the first particular manner is an addition manner or a subtraction manner; or indicate a second particular manner of determining the subband resource by using the particular frequency information, the first offset, and the second offset, where the second particular manner is an addition manner or a subtraction manner; and the determining module is further configured to determine the subband resource by using the subband resource information and the first signaling.

With reference to the second possible embodiment of the first aspect, in a sixth possible embodiment, the determining module is further configured to: when the subband resource information includes the first parameter and the second parameter, determine the subband resource according to the first parameter, the second parameter, and a third offset parameter, where the subband resource information further includes the third offset parameter, and the third offset parameter is used to determine the offset of the center subcarrier of the subband.

With reference to the second possible embodiment of the first aspect, in a seventh possible embodiment, the apparatus further includes a numbering module, where the numbering module is configured to: number subbands starting from one side of a center subcarrier of a carrier, and after the numbering on the available subbands on the side of the center subcarrier of the carrier is completed, number subbands from the other side of the center subcarrier of the carrier; or the numbering module is further configured to: number subbands starting from one side of a center subcarrier of a carrier, after numbering on one subband is completed, number subbands from the other side of the center subcarrier of the carrier, after numbering on one subband is completed, return to the side of the center subcarrier of the carrier and number remaining subbands on the side, and after numbering on one subband is completed, return to the other side of the center subcarrier of the carrier and number remaining subbands on the other side, until numbering on all available subbands on both sides of the center subcarrier of the carrier is completed.

With reference to the seventh possible embodiment of the first aspect, in an eighth possible embodiment, the subband resource information further includes a fourth offset parameter and/or a fifth offset parameter, where the fourth offset parameter is used to determine an offset of the subband, and the fifth offset parameter is used to determine the offset of the subband; and the determining module is further configured to: determine the subband resource according to the subband determining manner, the subband index, and the fourth offset parameter; or determine the subband resource according to the subband determining manner, the subband index, and the fifth offset parameter; or determine the subband resource according to the subband determining manner, the subband index, the fourth offset parameter, and the fifth offset parameter.

With reference to the eighth possible embodiment of the first aspect, in a ninth possible embodiment, the determining module is further configured to: when the subband index is greater than and/or equal to a first threshold, determine the subband resource according to the subband resource information and a sixth offset parameter, where the subband resource information further includes the sixth offset parameter, and the sixth offset parameter is used to determine the center subcarrier of the subband; or when the subband index is less than a first threshold, determine the subband resource according to the subband resource information and a sixth offset parameter; or when the subband index is an even number, determine the subband resource according to the subband resource information and a sixth offset parameter; or when the subband index is an odd number, determine the subband resource according to the subband resource information and a sixth offset parameter.

With reference to any one of the first aspect or the possible embodiments of the first aspect, in a tenth possible embodiment, when the subband resource is the subband, and when the subband includes 2M+2 subcarriers, where M is an integer greater than 0, one subcarrier of the subband is used as the center subcarrier of the subband, and the subband resource includes: the center subcarrier of the subband, M subcarriers whose frequency is less than a frequency of the center subcarrier of the subband, and M+1 subcarriers whose frequency is greater than the frequency of the center subcarrier of the subband; or the center subcarrier of the subband, M+1 subcarriers whose frequency is less than a frequency of the center subcarrier of the subband, and M subcarriers whose frequency is greater than the frequency of the center subcarrier of the subband; or two subcarriers of the subband are used as center subcarriers of the subband, and the subband resource includes: the center subcarriers of the subband, M subcarriers whose frequency is less than a frequency of a center subcarrier of the subband, and M subcarriers whose frequency is greater than the frequency of the center subcarrier of the subband.

With reference to any one of the first aspect or the possible embodiments of the first aspect, in an eleventh possible embodiment, the acquiring module includes a receiving unit and a determining unit, where the receiving unit is configured to: receive second signaling sent by the base station; and acquire the subband resource information from the second signaling; and the determining unit is configured to determine the subband resource information in a pre-specified manner.

With reference to any one of the first aspect or the possible embodiments of the first aspect, in a twelfth possible embodiment, the receiving module is further configured to: receive third signaling sent by the base station, and provide the third signaling to the determining module, where the third signaling indicates a duplex spacing between a downlink subband resource and an uplink subband resource; and the determining module is further configured to: when the subband resource is a downlink subband resource, determine an uplink subband resource according to the downlink subband resource and the duplex spacing; or when the subband resource is an uplink subband resource, determine a downlink subband resource according to the uplink subband resource and the duplex spacing.

According to a second aspect, an embodiment of the present invention provides an apparatus for determining a subband resource, where the apparatus is applied to a base station, the subband resource is a resource in a subband, the subband is a frequency resource that is in a bandwidth and that has an operating bandwidth, the bandwidth is a downlink bandwidth or an uplink bandwidth, the operating bandwidth is less than the bandwidth, and the apparatus includes:

an acquiring module, configured to: acquire subband resource information, and provide the subband resource information to a determining module, where the subband resource information includes information for determining a subband resource;

the determining module, configured to: determine the subband resource according to the subband resource information, and provide the subband resource to a transmission module; and the transmission module, configured to transmit data and/or control information according to the subband resource.

With reference to the second aspect, in a first possible embodiment, the subband resource is the subband, or the subband resource is a center subcarrier of the subband.

With reference to the second aspect or the first possible embodiment of the second aspect, in a second possible embodiment, the subband resource information includes particular frequency information and a first offset parameter, where the particular frequency information is used to determine the center subcarrier of the subband, and the first offset parameter is used to determine an offset of the center subcarrier of the subband; or the subband resource information includes a first parameter and a second parameter, where the first parameter is used to determine a location of the center subcarrier of the subband in a resource block RB, and the second parameter is used to determine the resource block RB in which the center subcarrier of the subband is located; or the subband resource information includes a subband determining manner and a subband index, where the subband determining manner specifies a formation manner of the subband in the bandwidth, and the subband index is a number of the subband in the bandwidth.

With reference to the second possible embodiment of the second aspect, in a third possible embodiment, when the subband resource information includes the particular frequency information and the first offset parameter, the particular frequency information is one or more of a center frequency of a center subcarrier of a carrier, a center subcarrier of a carrier, a subcarrier index of a center subcarrier of a carrier, a particular subcarrier of a carrier, an index of a particular subcarrier of a carrier, a particular resource block in a carrier, an index of a particular resource block in a carrier, a particular frequency in a carrier, a location of a particular frequency in a carrier, or a particular frequency resource in a carrier; and the first offset parameter indicates one or more of a subcarrier quantity of a first offset, a value of a frequency of a first offset, or a resource block quantity of a first offset.

With reference to the third possible embodiment of the second aspect, in a fourth possible embodiment, the determining module is further configured to: when a quantity of resource blocks included in the bandwidth is an odd number, determine the subband resource according to the particular frequency information, the first offset parameter, and a second offset parameter, where the subband resource information further includes the second offset parameter, the second offset parameter indicates that a second offset is N subcarriers or a frequency resource width of N subcarriers, and N is an integer not equal to 0.

With reference to the fourth possible embodiment of the second aspect, in a fifth possible embodiment, the apparatus further includes a generation module and a sending module, where the generation module is configured to: generate, used to indicate a first particular manner of determining the subband resource by using the particular frequency information and the first offset, and/or generate, used to indicate a second particular manner of determining the subband resource by using the particular frequency information, the first offset, and the second offset, where the first particular manner is an addition manner or a subtraction manner, and the second particular manner is an addition manner or a subtraction manner; and generate first signaling, where the first signaling indicates the first particular manner and/or the second particular manner;

the determining module is further configured to determine the subband resource according to the subband resource information, the first particular manner, and/or the second particular manner; and the sending module is configured to send the first signaling to user equipment UE.

With reference to the second possible embodiment of the second aspect, in a sixth possible embodiment, the determining module is further configured to: when the subband resource information includes the first parameter and the second parameter, determine the subband resource according to the first parameter, the second parameter, and a third offset parameter, where the subband resource information further includes the third offset parameter, and the third offset parameter is used to determine the offset of the center subcarrier of the subband.

With reference to the second possible embodiment of the second aspect, in a seventh possible embodiment, the apparatus further includes a numbering module, where the numbering module is further configured to: number subbands starting from one side of a center subcarrier of a carrier, and after the numbering on all subbands on the side of the center subcarrier of the carrier is completed, number subbands from the other side of the center subcarrier of the carrier; or number subbands starting from one side of a center subcarrier of a carrier, after numbering on one subband is completed, number subbands from the other side of the center subcarrier of the carrier, after numbering on one subband is completed, return to the side of the center subcarrier of the carrier and number remaining subbands on the side, and after numbering on one subband is completed, return to the other side of the center subcarrier of the carrier and number remaining subbands on the other side, until numbering on all subbands on both sides of the center subcarrier of the carrier is completed.

With reference to the seventh possible embodiment of the second aspect, in an eighth possible embodiment, the subband resource information further includes a fourth offset parameter and/or a fifth offset parameter, where the fourth offset parameter is used to determine an offset of the subband, and the fifth offset parameter is used to determine the offset of the subband; and the determining module is further configured to: determine the subband resource according to the subband determining manner, the subband index, and the fourth offset parameter; or determine the subband resource according to the subband determining manner, the subband index, and the fifth offset parameter; or determine the subband resource according to the subband determining manner, the subband index, the fourth offset parameter, and the fifth offset parameter.

With reference to the eighth possible embodiment of the second aspect, in a ninth possible embodiment, the determining module is further configured to: when the subband index is greater than and/or equal to a first threshold, determine the subband resource according to the subband resource information and a sixth offset parameter, where the subband resource information further includes the sixth offset parameter, and the sixth offset parameter is used to determine the center subcarrier of the subband; or when the subband index is less than a first threshold, determine the subband resource according to the subband resource information and a sixth offset parameter; or when the subband index is an even number, determine the subband resource according to the subband resource information and a sixth offset parameter; or when the subband index is an odd number, determine the subband resource according to the subband resource information and a sixth offset parameter.

With reference to any one of the second aspect or the possible embodiments of the second aspect, in a tenth possible embodiment, when the subband resource is the subband, and when the subband includes 2M+2 subcarriers, one subcarrier of the subband is used as the center subcarrier of the subband, and the subband resource includes: the center subcarrier of the subband, M subcarriers whose frequency is less than a frequency of the center subcarrier of the subband, and M+1 subcarriers whose frequency is greater than the frequency of the center subcarrier of the subband; or the center subcarrier of the subband, M+1 subcarriers whose frequency is less than a frequency of the center subcarrier of the subband, and M subcarriers whose frequency is greater than the frequency of the center subcarrier of the subband; or two subcarriers of the subband are used as center subcarriers of the subband, and the subband resource includes: the center subcarriers of the subband, M subcarriers whose frequency is less than a frequency of a center subcarrier of the subband, and M subcarriers whose frequency is greater than the frequency of the center subcarrier of the subband.

With reference to any one of the second aspect or the possible embodiments of the second aspect, in an eleventh possible embodiment, the acquiring module includes a generation unit and a determining unit, where the generation unit is configured to generate the subband resource information;

the determining unit is configured to determine the subband resource information in a pre-specified manner; and the sending module is further configured to send, to the UE, second signaling carrying the subband resource information.

With reference to any one of the second aspect or the possible embodiments of the second aspect, in a twelfth possible embodiment, the determining module is further configured to determine a duplex spacing between a downlink subband resource and an uplink subband resource;

the generation module is further configured to: generate third signaling, and provide the third signaling to the sending module;

the sending module is further configured to send, to the UE, the third signaling carrying the duplex spacing; and the determining module is further configured to: when the subband resource is a downlink subband resource, determine an uplink subband resource according to the downlink subband resource and the duplex spacing; or when the subband resource is an uplink subband resource, determine a downlink subband resource according to the downlink subband resource and the duplex spacing.

According to a third aspect, an embodiment of the present invention provides an apparatus for determining a subband resource, where the apparatus is applied to user equipment UE, the subband resource is a resource in a subband, the subband is a frequency resource that is in a bandwidth and that has an operating bandwidth, the bandwidth is a downlink bandwidth or an uplink bandwidth, the operating bandwidth is less than the bandwidth, and the apparatus includes:

a memory, configured to store information that includes a program instruction;

a processor, coupled to the memory and a transceiver, configured to control execution of the program instruction, and specifically configured to: acquire subband resource information, where the subband resource information includes information for determining a subband resource; and determine the subband resource according to the subband resource information; and the transceiver, configured to transmit data and/or control information according to the subband resource.

With reference to the third aspect, in a first possible embodiment, the subband resource is the subband, or the subband resource is a center subcarrier of the subband.

With reference to the third aspect or the first possible embodiment of the third aspect, in a second possible embodiment, the subband resource information includes particular frequency information and a first offset parameter, where the particular frequency information is used to determine the center subcarrier of the subband, and the first offset parameter is used to determine an offset of the center subcarrier of the subband; or the subband resource information includes a first parameter and a second parameter, where the first parameter is used to determine a location of the center subcarrier of the subband in a resource block RB, and the second parameter is used to determine the resource block RB in which the center subcarrier of the subband is located; or the subband resource information includes a subband determining manner and a subband index, where the subband determining manner specifies a formation manner of the subband in the bandwidth, and the subband index is a number of the subband in the bandwidth.

With reference to the second possible embodiment of the third aspect, in a third possible embodiment, when the subband resource information includes the particular frequency information and the first offset parameter, the particular frequency information is one or more of a center frequency of a center subcarrier of a carrier, a center subcarrier of a carrier, a subcarrier index of a center subcarrier of a carrier, a particular subcarrier of a carrier, an index of a particular subcarrier of a carrier, a particular resource block in a carrier, an index of a particular resource block in a carrier, a particular frequency in a carrier, a location of a particular frequency in a carrier, or a particular frequency resource in a carrier; and the first offset parameter indicates one or more of a subcarrier quantity of a first offset, a value of a frequency of a first offset, or a resource block quantity of a first offset.

With reference to the third possible embodiment of the third aspect, in a fourth possible embodiment, the processor is further configured to: when a quantity of resource blocks included in the bandwidth is an odd number, determine the subband resource according to the particular frequency information, the first offset parameter, and a second offset parameter, where the subband resource information further includes the second offset parameter, the second offset parameter indicates that a second offset is N subcarriers or a frequency resource width of N subcarriers, and N is an integer not equal to 0.

With reference to the fourth possible embodiment of the third aspect, in a fifth possible embodiment, the transceiver is further configured to: receive first signaling sent by a base station, and provide the first signaling to the processor, where the first signaling is used to: indicate a first particular manner of determining the subband resource by using the particular frequency information and the first offset, where the first particular manner is an addition manner or a subtraction manner; or indicate a second particular manner of determining the subband resource by using the particular frequency information, the first offset, and the second offset, where the second particular manner is an addition manner or a subtraction manner; and the processor is further configured to determine the subband resource by using the subband resource information and the first signaling.

With reference to the second possible embodiment of the third aspect, in a sixth possible embodiment, the processor is further configured to: when the subband resource information includes the first parameter and the second parameter, determine the subband resource according to the first parameter, the second parameter, and a third offset parameter, where the subband resource information further includes the third offset parameter, and the third offset parameter is used to determine the offset of the center subcarrier of the subband.

With reference to the second possible embodiment of the third aspect, in a seventh possible embodiment, the processor is further configured to: number subbands starting from one side of a center subcarrier of a carrier, and after the numbering on the available subbands on the side of the center subcarrier of the carrier is completed, number subbands from the other side of the center subcarrier of the carrier; or number subbands starting from one side of a center subcarrier of a carrier, after numbering on one subband is completed, number subbands from the other side of the center subcarrier of the carrier, after numbering on one subband is completed, return to the side of the center subcarrier of the carrier and number remaining subbands on the side, and after numbering of one subband is completed, return to the other side of the center subcarrier of the carrier and number remaining subbands on the other side, until numbering on all available subbands on both sides of the center subcarrier of the carrier is completed.

With reference to the seventh possible embodiment of the third aspect, in an eighth possible embodiment, the subband resource information further includes a fourth offset parameter and/or a fifth offset parameter, where the fourth offset parameter is used to determine an offset of the subband, and the fifth offset parameter is used to determine the offset of the subband; and the processor is further configured to: determine the subband resource according to the subband determining manner, the subband index, and the fourth offset parameter; or determine the subband resource according to the subband determining manner, the subband index, and the fifth offset parameter; or determine the subband resource according to the subband determining manner, the subband index, the fourth offset parameter, and the fifth offset parameter.

With reference to the eighth possible embodiment of the third aspect, in a ninth possible embodiment, the processor is further configured to: when the subband index is greater than and/or equal to a first threshold, determine the subband resource according to the subband resource information and a sixth offset parameter, where the subband resource information further includes the sixth offset parameter, and the sixth offset parameter is used to determine the center subcarrier of the subband; or when the subband index is less than a first threshold, determine the subband resource according to the subband resource information and a sixth offset parameter; or when the subband index is an even number, determine the subband resource according to the subband resource information and a sixth offset parameter; or when the subband index is an odd number, determine the subband resource according to the subband resource information and a sixth offset parameter.

With reference to any one of the third aspect or the possible embodiments of the third aspect, in a tenth possible embodiment, when the subband resource is the subband, and when the subband includes 2M+2 subcarriers, where M is an integer greater than 0, one subcarrier of the subband is used as the center subcarrier of the subband, and the subband resource includes: the center subcarrier of the subband, M subcarriers whose frequency is less than a frequency of the center subcarrier of the subband, and M+1 subcarriers whose frequency is greater than the frequency of the center subcarrier of the subband; or the center subcarrier of the subband, M+1 subcarriers whose frequency is less than a frequency of the center subcarrier of the subband, and M subcarriers whose frequency is greater than the frequency of the center subcarrier of the subband; or two subcarriers of the subband are used as center subcarriers of the subband, and the subband resource includes: the center subcarriers of the subband, M subcarriers whose frequency is less than a frequency of a center subcarrier of the subband, and M subcarriers whose frequency is greater than the frequency of the center subcarrier of the subband.

With reference to any one of the third aspect or the possible embodiments of the third aspect, in an eleventh possible embodiment, the transceiver is further configured to: receive second signaling sent by the base station; and acquire the subband resource information from the second signaling; and the processor is further configured to determine the subband resource information in a pre-specified manner.

With reference to any one of the third aspect or the possible embodiments of the third aspect, in a twelfth possible embodiment, the transceiver is further configured to: receive third signaling sent by the base station, and provide the third signaling to the processor, where the third signaling indicates a duplex spacing between a downlink subband resource and an uplink subband resource; and the processor is further configured to: when the subband resource is a downlink subband resource, determine an uplink subband resource according to the downlink subband resource and the duplex spacing; or when the subband resource is an uplink subband resource, determine a downlink subband resource according to the uplink subband resource and the duplex spacing.

According to a fourth aspect, an embodiment of the present invention provides an apparatus for determining a subband resource, where the apparatus is applied to a base station, the subband resource is a resource in a subband, the subband is a frequency resource that is in a bandwidth and that has an operating bandwidth, the bandwidth is a downlink bandwidth or an uplink bandwidth, the operating bandwidth is less than the bandwidth, and the apparatus includes:

a memory, configured to store information that includes a program instruction;

a processor, coupled to the memory and a transceiver, configured to control execution of the program instruction, and specifically configured to: acquire subband resource information, where the subband resource information includes information for determining a subband resource; and determine the subband resource according to the subband resource information; and the transceiver, configured to transmit data and/or control information according to the subband resource.

With reference to the fourth aspect, in a first possible embodiment, the subband resource is the subband, or the subband resource is a center subcarrier of the subband.

With reference to the fourth aspect or the first possible embodiment of the fourth aspect, in a second possible embodiment, the subband resource information includes particular frequency information and a first offset parameter, where the particular frequency information is used to determine the center subcarrier of the subband, and the first offset parameter is used to determine an offset of the center subcarrier of the subband; or the subband resource information includes a first parameter and a second parameter, where the first parameter is used to determine a location of the center subcarrier of the subband in a resource block RB, and the second parameter is used to determine the resource block RB in which the center subcarrier of the subband is located; or the subband resource information includes a subband determining manner and a subband index, where the subband determining manner specifies a formation manner of the subband in the bandwidth, and the subband index is a number of the subband in the bandwidth.

With reference to the second possible embodiment of the fourth aspect, in a third possible embodiment, when the subband resource information includes the particular frequency information and the first offset parameter, the particular frequency information is one or more of a center frequency of a center subcarrier of a carrier, a center subcarrier of a carrier, a subcarrier index of a center subcarrier of a carrier, a particular subcarrier of a carrier, an index of a particular subcarrier of a carrier, a particular resource block in a carrier, an index of a particular resource block in a carrier, a particular frequency in a carrier, a location of a particular frequency in a carrier, or a particular frequency resource in a carrier; and the first offset parameter indicates one or more of a subcarrier quantity of a first offset, a value of a frequency of a first offset, or a resource block quantity of a first offset.

With reference to the third possible embodiment of the fourth aspect, in a fourth possible embodiment, the processor is further configured to: when a quantity of resource blocks included in the bandwidth is an odd number, determine the subband resource according to the particular frequency information, the first offset parameter, and a second offset parameter, where the subband resource information further includes the second offset parameter, the second offset parameter indicates that a second offset is N subcarriers or a frequency resource width of N subcarriers, and N is an integer not equal to 0.

With reference to the fourth possible embodiment of the fourth aspect, in a fifth possible embodiment, the processor is further configured to: generate, used to indicate a first particular manner of determining the subband resource by using the particular frequency information and the first offset, and/or generate, used to indicate a second particular manner of determining the subband resource by using the particular frequency information, the first offset, and the second offset, where the first particular manner is an addition manner or a subtraction manner, and the second particular manner is an addition manner or a subtraction manner; generate first signaling, where the first signaling indicates the first particular manner and/or the second particular manner; and determine the subband resource according to the subband resource information, the first particular manner, and/or the second particular manner; and the transceiver is further configured to send the first signaling to user equipment UE.

With reference to the second possible embodiment of the fourth aspect, in a sixth possible embodiment, the processor is further configured to: when the subband resource information includes the first parameter and the second parameter, determine the subband resource according to the first parameter, the second parameter, and a third offset parameter, where the subband resource information further includes the third offset parameter, and the third offset parameter is used to determine the offset of the center subcarrier of the subband.

With reference to the second possible embodiment of the fourth aspect, in a seventh possible embodiment, the processor is further configured to: number subbands starting from one side of a center subcarrier of a carrier, and after the numbering on all subbands on the side of the center subcarrier of the carrier is completed, number subbands from the other side of the center subcarrier of the carrier; or number subbands starting from one side of a center subcarrier of a carrier, after numbering on one subband is completed, number subbands from the other side of the center subcarrier of the carrier, after numbering on one subband is completed, return to the side of the center subcarrier of the carrier and number remaining subbands on the side, and after numbering on one subband is completed, return to the other side of the center subcarrier of the carrier and number remaining subbands on the other side, until numbering on all subbands on both sides of the center subcarrier of the carrier is completed.

With reference to the seventh possible embodiment of the fourth aspect, in an eighth possible embodiment, the subband resource information further includes a fourth offset parameter and/or a fifth offset parameter, where the fourth offset parameter is used to determine an offset of the subband, and the fifth offset parameter is used to determine the offset of the subband; and the processor is further configured to: determine the subband resource according to the subband determining manner, the subband index, and the fourth offset parameter; or determine the subband resource according to the subband determining manner, the subband index, and the fifth offset parameter; or determine the subband resource according to the subband determining manner, the subband index, the fourth offset parameter, and the fifth offset parameter.

With reference to the eighth possible embodiment of the fourth aspect, in a ninth possible embodiment, the processor is further configured to: when the subband index is greater than and/or equal to a first threshold, determine the subband resource according to the subband resource information and a sixth offset parameter, where the subband resource information further includes the sixth offset parameter, and the sixth offset parameter is used to determine the center subcarrier of the subband; or when the subband index is less than a first threshold, the base station determines the subband resource according to the subband resource information and a sixth offset parameter; or when the subband index is an even number, determine the subband resource according to the subband resource information and a sixth offset parameter; or when the subband index is an odd number, determine the subband resource according to the subband resource information and a sixth offset parameter.

With reference to any one of the fourth aspect or the possible embodiments of the fourth aspect, in a tenth possible embodiment, when the subband resource is the subband, and when the subband includes 2M+2 subcarriers, one subcarrier of the subband is used as the center subcarrier of the subband, and the subband resource includes: the center subcarrier of the subband, M subcarriers whose frequency is less than a frequency of the center subcarrier of the subband, and M+1 subcarriers whose frequency is greater than the frequency of the center subcarrier of the subband; or the center subcarrier of the subband, M+1 subcarriers whose frequency is less than a frequency of the center subcarrier of the subband, and M subcarriers whose frequency is greater than the frequency of the center subcarrier of the subband; or two subcarriers of the subband are used as center subcarriers of the subband, and the subband resource includes: the center subcarriers of the subband, M subcarriers whose frequency is less than a frequency of a center subcarrier of the subband, and M subcarriers whose frequency is greater than the frequency of the center subcarrier of the subband.

With reference to any one of the fourth aspect or the possible embodiments of the fourth aspect, in an eleventh possible embodiment, the processor is further configured to: generate the subband resource information; and determine the subband resource information in a pre-specified manner; and the transceiver is further configured to send, to the UE, second signaling carrying the subband resource information.

With reference to any one of the fourth aspect or the possible embodiments in the fourth aspect, in a twelfth possible embodiment, the processor is further configured to: determine a duplex spacing between a downlink subband resource and an uplink subband resource; and generate third signaling, and provide the third signaling to the transceiver;

the transceiver is further configured to send, to the UE, the third signaling carrying the duplex spacing; and the processor is further configured to: when the subband resource is a downlink subband resource, determine an uplink subband resource according to the downlink subband resource and the duplex spacing; or when the subband resource is an uplink subband resource, determine a downlink subband resource according to the downlink subband resource and the duplex spacing.

According to a fifth aspect, an embodiment of the present invention provides a method for determining a subband resource, where the method is applied to user equipment UE, the subband resource is a resource in a subband, the subband is a frequency resource that is in a bandwidth and that has an operating bandwidth, the bandwidth is a downlink bandwidth or an uplink bandwidth, the operating bandwidth is less than the bandwidth, and the method includes:

acquiring, by the UE, subband resource information, where the subband resource information includes information for determining a subband resource;

determining, by the UE, the subband resource according to the subband resource information; and transmitting, by the UE, data and/or control information according to the subband resource.

With reference to the fifth aspect, in a first possible embodiment, the subband resource is the subband, or the subband resource is a center subcarrier of the subband.

With reference to the fifth aspect or the first possible embodiment of the fifth aspect, in a second possible embodiment, the subband resource information includes particular frequency information and a first offset parameter, where the particular frequency information is used to determine the center subcarrier of the subband, and the first offset parameter is used to determine an offset of the center subcarrier of the subband; or the subband resource information includes a first parameter and a second parameter, where the first parameter is used to determine a location of the center subcarrier of the subband in a resource block RB, and the second parameter is used to determine the resource block RB in which the center subcarrier of the subband is located; or the subband resource information includes a subband determining manner and a subband index, where the subband determining manner specifies a formation manner of the subband in the bandwidth, and the subband index is a number of the subband in the bandwidth.

With reference to the second possible embodiment of the fifth aspect, in a third possible embodiment, when the subband resource information includes the particular frequency information and the first offset parameter, the particular frequency information is one or more of a center frequency of a center subcarrier of a carrier, a center subcarrier of a carrier, a subcarrier index of a center subcarrier of a carrier, a particular subcarrier of a carrier, an index of a particular subcarrier of a carrier, a particular resource block in a carrier, an index of a particular resource block in a carrier, a particular frequency in a carrier, a location of a particular frequency in a carrier, or a particular frequency resource in a carrier; and the first offset parameter indicates one or more of a subcarrier quantity of a first offset, a value of a frequency of a first offset, or a resource block quantity of a first offset.

With reference to the third possible embodiment of the fifth aspect, in a fourth possible embodiment, when a quantity of resource blocks included in the bandwidth is an odd number, the subband resource information further includes a second offset parameter, where the second offset parameter indicates that a second offset is N subcarriers or a frequency resource width of N subcarriers, and N is an integer not equal to 0; and the determining, by the UE, the subband resource according to the subband resource information includes:

determining, by the UE, the subband resource according to the particular frequency information, the first offset parameter, and the second offset parameter.

With reference to the fourth possible embodiment of the fifth aspect, in a fifth possible embodiment, the method further includes:

receiving, by the UE, first signaling sent by a base station, where the first signaling is used to: indicate a first particular manner of determining the subband resource by using the particular frequency information and the first offset, where the first particular manner is an addition manner or a subtraction manner; or indicate a second particular manner of determining the subband resource by using the particular frequency information, the first offset, and the second offset, where the second particular manner is an addition manner or a subtraction manner; and the determining, by the UE, the subband resource according to the subband resource information includes:

determining, by the UE, the subband resource by using the subband resource information and the first signaling.

With reference to the second possible embodiment of the fifth aspect, in a sixth possible embodiment, when the subband resource information includes the first parameter and the second parameter, the subband resource information further includes a third offset parameter, where the third offset parameter is used to determine the offset of the center subcarrier of the subband; and the determining, by the UE, the subband resource according to the subband resource information includes:

determining, by the UE, the subband resource according to the first parameter, the second parameter, and the third offset parameter.

With reference to the second possible embodiment of the fifth aspect, in a seventh possible embodiment, when the subband resource information includes a subband determining manner and a subband index, for the subband determining manner, a subband determining manner 1 or a subband determining manner 2 is used, where the subband determining manner 1: numbering, by the UE, subbands starting from one side of a center subcarrier of a carrier, and after the numbering on the available subbands on the side of the center subcarrier of the carrier is completed, numbering subbands from the other side of the center subcarrier of the carrier; or the subband determining manner 2: numbering, by the UE, subbands starting from one side of a center subcarrier of a carrier, after numbering on one subband is completed, numbering subbands from the other side of the center subcarrier of the carrier, after numbering on one subband is completed, returning to the side of the center subcarrier of the carrier and numbering remaining subbands on the side, and after numbering on one subband is completed, returning to the other side of the center subcarrier of the carrier and numbering remaining subbands on the other side, until numbering on all available subbands on both sides of the center subcarrier of the carrier is completed.

With reference to the seventh possible embodiment of the fifth aspect, in an eighth possible embodiment, the subband resource information further includes a fourth offset parameter and/or a fifth offset parameter, where the fourth offset parameter is used to determine an offset of the subband, and the fifth offset parameter is used to determine the offset of the subband; and the determining, by the UE, the subband resource according to the subband resource information includes:

determining, by the UE, the subband resource according to the subband determining manner, the subband index, and the fourth offset parameter; or determining, by the UE, the subband resource according to the subband determining manner, the subband index, and the fifth offset parameter; or determining, by the UE, the subband resource according to the subband determining manner, the subband index, the fourth offset parameter, and the fifth offset parameter.

With reference to the eighth possible embodiment of the fifth aspect, in a ninth possible embodiment, the subband resource information further includes a sixth offset parameter, where the sixth offset parameter is used to determine the center subcarrier of the subband, and the determining, by the UE, the subband resource according to the subband resource information includes:

when the subband index is greater than and/or equal to a first threshold, determining, by the UE, the subband resource according to the subband resource information and the sixth offset parameter; or when the subband index is less than a first threshold, determining, by the UE, the subband resource according to the subband resource information and the sixth offset parameter; or when the subband index is an even number, determining, by the UE, the subband resource according to the subband resource information and the sixth offset parameter; or when the subband index is an odd number, determining, by the UE, the subband resource according to the subband resource information and the sixth offset parameter.

With reference to any one of the fifth aspect or the possible embodiments of the fifth aspect, in a tenth possible embodiment, when the subband resource is the subband, and when the subband includes 2M+2 subcarriers, where M is an integer greater than 0, one subcarrier of the subband is used as the center subcarrier of the subband, and the subband resource includes: the center subcarrier of the subband, M subcarriers whose frequency is less than a frequency of the center subcarrier of the subband, and M+1 subcarriers whose frequency is greater than the frequency of the center subcarrier of the subband; or the center subcarrier of the subband, M+1 subcarriers whose frequency is less than a frequency of the center subcarrier of the subband, and M subcarriers whose frequency is greater than the frequency of the center subcarrier of the subband; or two subcarriers of the subband are used as center subcarriers of the subband, and the subband resource includes: the center subcarriers of the subband, M subcarriers whose frequency is less than a frequency of a center subcarrier of the subband, and M subcarriers whose frequency is greater than the frequency of the center subcarrier of the subband.

With reference to any one of the fifth aspect or the possible embodiments of the fifth aspect, in an eleventh possible embodiment, the acquiring, by the UE, subband resource information includes:

receiving, by the UE, second signaling sent by the base station; and acquiring the subband resource information from the second signaling; and/or determining, by the UE, the subband resource information in a pre-specified manner.

With reference to any one of the fifth aspect or the possible embodiments of the fifth aspect, in a twelfth possible embodiment, after the determining, by the UE, the subband resource according to the subband resource information, the method further includes:

receiving, by the UE, third signaling sent by the base station, where the third signaling indicates a duplex spacing between a downlink subband resource and an uplink subband resource; and when the subband resource is a downlink subband resource, determining, by the UE, an uplink subband resource according to the downlink subband resource and the duplex spacing; or when the subband resource is an uplink subband resource, determining, by the UE, a downlink subband resource according to the uplink subband resource and the duplex spacing.

According to a sixth aspect, an embodiment of the present invention provides a method for determining a subband resource, where the method is applied to a base station, the subband resource is a resource in a subband, the subband is a frequency resource that is in a bandwidth and that has an operating bandwidth, the bandwidth is a downlink bandwidth or an uplink bandwidth, the operating bandwidth is less than the bandwidth, and the method includes:

acquiring, by the base station, subband resource information, where the subband resource information includes information for determining a subband resource;

determining, by the base station, the subband resource according to the subband resource information; and transmitting, by the base station, data and/or control information according to the subband resource.

With reference to the sixth aspect, in a first possible embodiment, the subband resource is the subband, or the subband resource is a center subcarrier of the subband.

With reference to the sixth aspect or the first possible embodiment of the sixth aspect, in a second possible embodiment, the subband resource information includes particular frequency information and a first offset parameter, where the particular frequency information is used to determine the center subcarrier of the subband, and the first offset parameter is used to determine an offset of the center subcarrier of the subband; or the subband resource information includes a first parameter and a second parameter, where the first parameter is used to determine a location of the center subcarrier of the subband in a resource block RB, and the second parameter is used to determine the resource block RB in which the center subcarrier of the subband is located; or the subband resource information includes a subband determining manner and a subband index, where the subband determining manner specifies a formation manner of the subband in the bandwidth, and the subband index is a number of the subband in the bandwidth.

With reference to the second possible embodiment of the sixth aspect, in a third possible embodiment, when the subband resource information includes the particular frequency information and the first offset parameter, the particular frequency information is one or more of a center frequency of a center subcarrier of a carrier, a center subcarrier of a carrier, a subcarrier index of a center subcarrier of a carrier, a particular subcarrier of a carrier, an index of a particular subcarrier of a carrier, a particular resource block in a carrier, an index of a particular resource block in a carrier, a particular frequency in a carrier, a location of a particular frequency in a carrier, or a particular frequency resource in a carrier; and the first offset parameter indicates one or more of a subcarrier quantity of a first offset, a value of a frequency of a first offset, or a resource block quantity of a first offset.

With reference to the third possible embodiment of the sixth aspect, in a fourth possible embodiment, when a quantity of resource blocks included in the bandwidth is an odd number, the subband resource information further includes a second offset parameter, where the second offset parameter indicates that a second offset is N subcarriers or a frequency resource width of N subcarriers, and N is an integer not equal to 0; and the determining, by the base station, the subband resource according to the subband resource information includes:

determining, by the base station, the subband resource according to the particular frequency information, the first offset parameter, and the second offset parameter.

With reference to the fourth possible embodiment of the sixth aspect, in a fifth possible embodiment, the method further includes:

generating, by the base station, used to indicate a first particular manner of determining the subband resource by using the particular frequency information and the first offset, and/or generating, used to indicate a second particular manner of determining the subband resource by using the particular frequency information, the first offset, and the second offset, where the first particular manner is an addition manner or a subtraction manner, and the second particular manner is an addition manner or a subtraction manner;

generating, by the base station, first signaling, where the first signaling indicates the first particular manner and/or the second particular manner;

determining, by the base station, the subband resource according to the subband resource information, the first particular manner, and/or the second particular manner; and sending, by the base station, the first signaling to user equipment UE.

With reference to the second possible embodiment of the sixth aspect, in a sixth possible embodiment, when the subband resource information includes the first parameter and the second parameter, the subband resource information further includes a third offset parameter, where the third offset parameter is used to determine the offset of the center subcarrier of the subband; and the determining, by the base station, the subband resource according to the subband resource information includes:

determining, by the base station, the subband resource according to the first parameter, the second parameter, and the third offset parameter.

With reference to the second possible embodiment of the sixth aspect, in a seventh possible embodiment, when the subband resource information includes a subband determining manner and a subband index, for the subband determining manner, a subband determining manner 1 or a subband determining manner 2 is used, where the subband determining manner 1: numbering, by the base station, subbands starting from one side of a center subcarrier of a carrier, and after the numbering on all subbands on the side of the center subcarrier of the carrier is completed, numbering subbands from the other side of the center subcarrier of the carrier;

the subband determining manner 2: numbering, by the base station, subbands starting from one side of a center subcarrier of a carrier, after numbering on one subband is completed, numbering subbands from the other side of the center subcarrier of the carrier, after numbering on one subband is completed, returning to the side of the center subcarrier of the carrier and numbering remaining subbands on the side, and after numbering on one subband is completed, returning to the other side of the center subcarrier of the carrier and numbering remaining subbands on the other side, until numbering on all subbands on both sides of the center subcarrier of the carrier is completed.

With reference to the seventh possible embodiment of the sixth aspect, in an eighth possible embodiment, the subband resource information further includes a fourth offset parameter and/or a fifth offset parameter, where the fourth offset parameter is used to determine an offset of the subband, and the fifth offset parameter is used to determine the offset of the subband; and the determining, by the base station, the subband resource according to the subband resource information includes:

determining, by the base station, the subband resource according to the subband determining manner, the subband index, and the fourth offset parameter; or determining, by the base station, the subband resource according to the subband determining manner, the subband index, and the fifth offset parameter; or determining, by the base station, the subband resource according to the subband determining manner, the subband index, the fourth offset parameter, and the fifth offset parameter.

With reference to the eighth possible embodiment of the sixth aspect, in a ninth possible embodiment, the subband resource information further includes a sixth offset parameter, where the sixth offset parameter is used to determine the center subcarrier of the subband, and the determining, by the base station, the subband resource according to the subband resource information includes:

when the subband index is greater than and/or equal to a first threshold, determining, by the base station, the subband resource according to the subband resource information and the sixth offset parameter; or when the subband index is less than a first threshold, determining, by the base station, the subband resource according to the subband resource information and the sixth offset parameter; or when the subband index is an even number, determining, by the base station, the subband resource according to the subband resource information and the sixth offset parameter; or when the subband index is an odd number, determining, by the base station, the subband resource according to the subband resource information and the sixth offset parameter.

With reference to any one of the sixth aspect or the possible embodiments of the sixth aspect, in a tenth possible embodiment, when the subband resource is the subband, and when the subband includes 2M+2 subcarriers, one subcarrier of the subband is used as the center subcarrier of the subband, and the subband resource includes: the center subcarrier of the subband, M subcarriers whose frequency is less than a frequency of the center subcarrier of the subband, and M+1 subcarriers whose frequency is greater than the frequency of the center subcarrier of the subband; or the center subcarrier of the subband, M+1 subcarriers whose frequency is less than a frequency of the center subcarrier of the subband, and M subcarriers whose frequency is greater than the frequency of the center subcarrier of the subband; or two subcarriers of the subband are used as center subcarriers of the subband, and the subband resource includes: the center subcarriers of the subband, M subcarriers whose frequency is less than a frequency of a center subcarrier of the subband, and M subcarriers whose frequency is greater than the frequency of the center subcarrier of the subband.

With reference to any one of the sixth aspect or the possible embodiments of the sixth aspect, in an eleventh possible embodiment, the acquiring, by the base station, subband resource information includes:

generating, by the base station, the subband resource information; and/or determining, by the base station, the subband resource information in a pre-specified manner;

after the acquiring, by the base station, subband resource information, the method further includes:

sending, by the base station to the UE, second signaling carrying the subband resource information.

With reference to any one of the sixth aspect or the possible embodiments of the sixth aspect, in a twelfth possible embodiment, after the determining, by the base station, the subband resource according to the subband resource information, the method further includes:

determining, by the base station, a duplex spacing between a downlink subband resource and an uplink subband resource;

generating, by the base station, third signaling;

sending, by the base station to the UE, the third signaling carrying the duplex spacing; and when the subband resource is a downlink subband resource, determining, by the base station, an uplink subband resource according to the downlink subband resource and the duplex spacing; or when the subband resource is an uplink subband resource, determining, by the base station, a downlink subband resource according to the downlink subband resource and the duplex spacing.

The present invention provides the apparatus and method for determining a subband resource. Compared with a problem in the prior art that communication between low-complexity UE and a base station is impeded because the low-complexity UE can only send or receive data within an operating bandwidth on a carrier, and the low-complexity UE cannot know which operating bandwidth size bandwidth in a bandwidth is a bandwidth used to transmit data related to the low-complexity UE, in the present invention, UE acquires subband resource information to determine a subband resource, so that data and/or control information can be transmitted according to the subband resource. In this case, when an operating bandwidth is less than a carrier bandwidth, the UE may determine, by using the subband resource, that a frequency bandwidth size bandwidth in a bandwidth is a bandwidth for sending or receiving data related to the UE, so that the user equipment can communicate with a base station while costs of the UE or complexity of the UE is reduced.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show only some embodiments of the present invention, and a person of ordinary skill in the art may still derive other drawings from these accompanying drawings without creative efforts.

DESCRIPTION OF EMBODIMENTS

Figure 1:
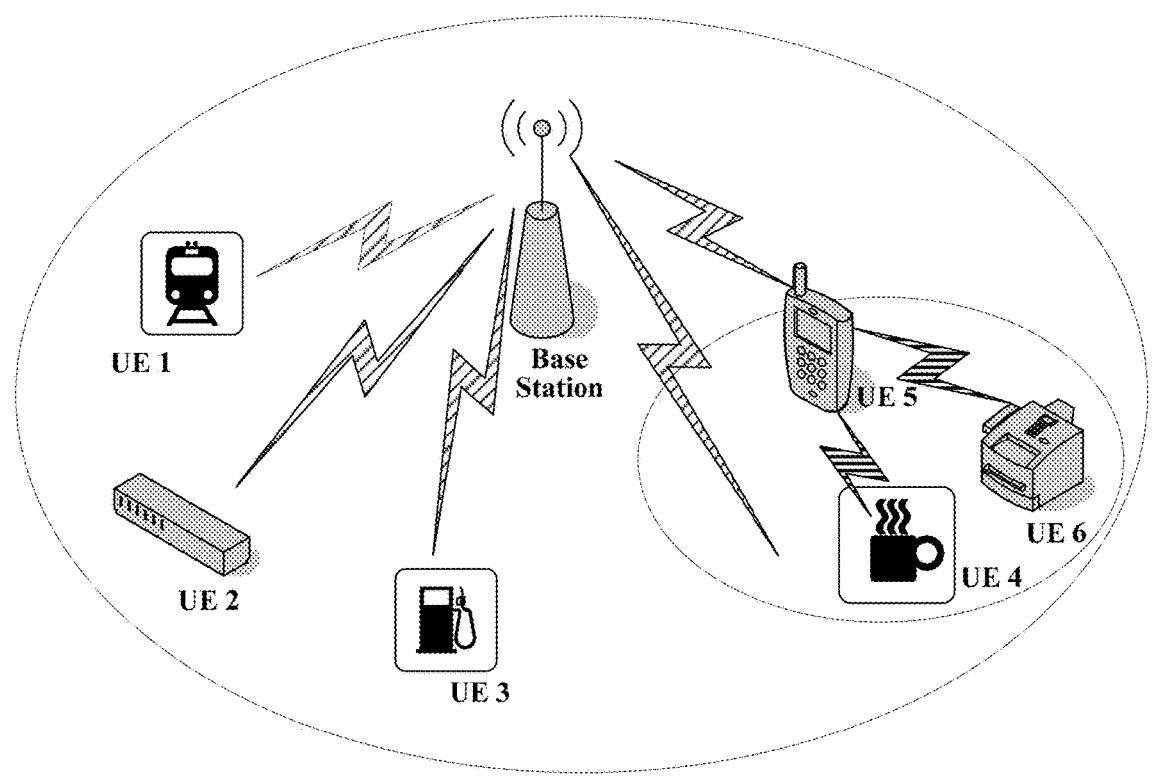
FIG. 1 is a schematic diagram of a communications system according to an embodiment of the present invention.

The following clearly describes the technical solutions in the embodiments of the present invention with reference to the accompanying drawings in the embodiments of the present invention. Apparently, the described embodiments are only a part rather than all of the embodiments of the present invention. All other embodiments obtained by a person of ordinary skill in the art based on the embodiments of the present invention without creative efforts shall fall within the protection scope of the present invention.

Terminologies such as "component", "module", and "system" that are used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both an application that runs on a computation device and the computation device may be components. One or more components may reside within a process and/or a thread of execution, and a component may be located on one computer and/or distributed between two or more computers. In addition, these components may be various computer-readable media that store various data structures. For example, the components may communicate by using a local and/or remote process and according to, for example, a signal having one or more data packets (for example, data from two components interacting with another component in a local system, a distributed system, and/or a network such as the Internet interacting with other systems by using the signal).

UE may be wireless user equipment or wired user equipment. For example, the wireless user equipment may refer to a device that provides a user with voice and/or data connectivity, a handheld device with a radio connection function, or another processing device connected to a radio modem. The wireless user equipment may communicate with one or more core networks by using a radio access network (for example, RAN, Radio Access Network). The wireless user equipment may be mobile user equipment, for example, a mobile phone (or referred to as a "cellular" phone), or a computer with mobile user equipment; for example, the wireless user equipment may be a portable, pocket-sized, handheld, computer built-in, or in-vehicle mobile apparatus, which exchanges voice and/or data with the radio access network. For example, the wireless user equipment may be a device such as a personal communication service (PCS) phone, a cordless telephone set, a Session Initiation Protocol (SIP) phone, a wireless local loop (WLL) station, or a personal digital assistant (PDA). The wireless user equipment may also be referred to as a system, a subscriber unit, a subscriber station, a mobile station, a mobile terminal (Mobile), a remote station, an access point (AP), a remote terminal, an access terminal, a user terminal, a user agent, or user equipment (UE).

In the embodiments of the present invention, UE may refer to UE that can send and/or receive only an operating bandwidth (the operating bandwidth is less than a carrier bandwidth; for example, the carrier bandwidth is 20 MHz, and the operating bandwidth is 200 KHz, 1.4 MHz, 3 MHz, 5 MHz, or the like) on a carrier, and/or UE having a feature of enhanced transmission. Specifically, the UE is low-complexity UE, and/or low-cost UE, and/or low-power-consumption UE, and/or UE having a feature of enhanced transmission, and/or new-type UE.

The operating bandwidth of the UE may be understood as a frequency width at which a transceiver of the UE operates normally, or a maximum frequency width supported by the transceiver of the UE. For example, in an LTE system, currently defined system bandwidths are 20 MHz, 10 MHz, 5 MHz, 3 MHz, and 1.4 MHz. Assuming that an operating bandwidth of the LTE system is 20 MHz, the operating bandwidth of the UE may be one of various possible values such as 200 KHz, 1 MHz, 1.4 MHz, and 5 MHz. A value herein is only exemplary. An actual operating bandwidth of the UE may be set based on an actual requirement. For example, the actual operating bandwidth is determined according to one or more requirements of a radio frequency capability, a baseband processing capability, a processor, a filter, and the like of the UE. For example, the radio frequency capability and/or the baseband processing capability of the UE are/is less than a system bandwidth. For example, the system bandwidth is 20 MHz, and the radio frequency capability and/or the baseband processing capability of the UE are/is 200 KHz or 1.4 MHz.

For example, the low-complexity UE refers to a type of UE that can send and/or receive only an operating bandwidth on a carrier. Without otherwise specified, in the present invention, an example in which UE is low-complexity UE is used to describe the method of the present invention. In the present invention, enhanced transmission may be one or more of repeated transmission, spread spectrum transmission, retransmission, transmission time interval bundling, narrowband (for example, subcarrier scheduling) transmission, ultra-narrowband (for example, a bandwidth is tens of hertz to tens of thousands of hertz) transmission, transmission of power spectrum density boosting, relaxed-requirement transmission, or transmission of keep trying.

A base station in the embodiments of the present invention may specifically refer to a device that communicates with wireless UE by using an air interface. For example, the base station is an access point or a terminal device. The base station may be an evolved base station eNodeB. The base station may also be considered as a cell.

The present invention is mainly applied to an Long Term Evolution (LTE) system or an LTE Advanced (LTE-A) system. The present invention may also be applied to another communications system, provided that in the communications system, there is an entity that can send information and another entity that can receive information.

Various aspects are described in this specification with reference to UE and/or a base station.

In the present invention, the base station or the UE transmits data and/or control information according to a subband resource. The data may include a reference signal or a pilot signal or a sequence. The control information is carried on a control channel. The control channel may be an enhanced physical downlink control channel or another channel that carries the control information. Certainly, in the present invention, the base station or the UE may further transmit other information according to the subband resource.

As shown in FIG. 1, a base station and UE 1 to UE 6 form a communications system. In the communications system, the base station sends public information to one or more UEs of the UE 1 to the UE 6. In addition, the UE 4 to the UE 6 may also form a communications system. In the communications system, the UE 5 may send common information to one or more UEs of the UE 4 or the UE 6. A base station in the communications system may refer to a device that communicates with wireless user equipment by using one or more sectors on an air interface in an access network. The base station may be configured to: mutually convert a received over-the-air frame and an IP packet and serve as a router between the wireless user equipment and a remaining portion of the access network, where the remaining portion of the access network may include an Internet Protocol (IP) network. The base station may also coordinate attribute management of the air interface. Optionally, the base station may be an evolved NodeB (NodeB or eNB or e-NodeB) in LTE.

It can be understood that in the communications system including the UE 4, the UE 5, and the UE 6, the UE 5 is a hotspot in the communications system. An effect of the UE 5 is similar to that of a base station. For ease of description, in the present invention, each hotspot in the communications system is referred to as a base station, and remaining devices are referred to as UEs.

Figure 2:
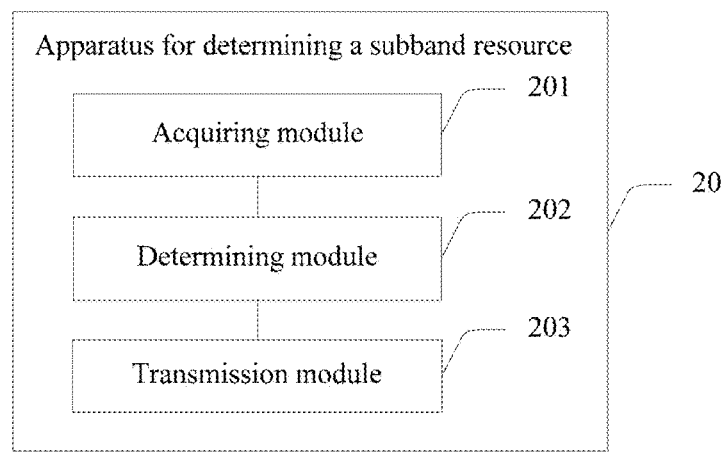
FIG. 2 is a schematic logic diagram of an apparatus for determining a subband resource according to an embodiment of the present invention.

As shown in FIG. 2, an embodiment of the present invention provides an apparatus 20 for determining a subband resource. The apparatus 20 is applied to UE. A subband resource in the apparatus 20 is a resource in a subband. The subband is a frequency resource that is in a bandwidth and that has an operating bandwidth. The bandwidth is a downlink bandwidth or an uplink bandwidth. The operating bandwidth is less than the bandwidth. The apparatus 20 includes an acquiring module 201, a determining module 202, and a transmission module 203.

The acquiring module 201 is configured to: acquire subband resource information, and provide the subband resource information to the determining module 202, where the subband resource information includes information for determining a subband resource.

The determining module 202 is configured to: determine the subband resource according to the subband resource information, and provide the subband resource to the transmission module 203.

The transmission module 203 is configured to transmit data and/or control information according to the subband resource.

The present invention provides the apparatus for determining a subband resource. Compared with a problem in the prior art that communication between low-complexity UE and a base station is impeded because the low-complexity UE can only send or receive data within an operating bandwidth on a carrier, and the low-complexity UE cannot know which operating bandwidth size bandwidth in a bandwidth is a bandwidth used to transmit data related to the low-complexity UE, in the present invention, a determining module in the UE uses subband resource information acquired by an acquiring module to determine the subband resource, so that a transmission module can transmit data and/or control information according to the subband resource. In this case, when an operating bandwidth is less than a carrier bandwidth, the UE may determine, by using the subband resource, that a particular frequency bandwidth size bandwidth in a bandwidth is a bandwidth for sending or receiving data related to the UE, so that the user equipment can communicate with a base station while costs of the UE or complexity of the UE is reduced.

It should be noted that the subband resource in the present invention may be the subband, or may be a center subcarrier of the subband.

The subband may include at least one resource block (RB) or physical resource block (PRB). In the present invention, the RB and the PRB are interchangeable. The RB/PRB is a time-frequency two-dimensional concept. The RB/PRB occupies at least one subcarrier in a frequency domain and occupies at least one timeslot in a time domain. For ease of description, for a carrier and a subband in the present invention, only a frequency dimension is represented.

Figure 3A:
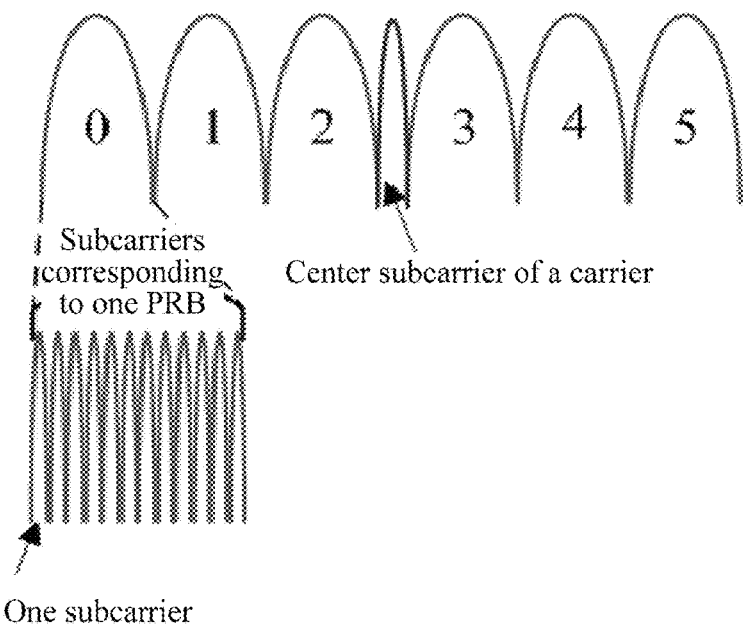
FIG. 3(a) is a schematic diagram of a subband in a method for determining a subband resource according to an embodiment of the present invention.

As shown in FIG. 3(a), a subband in FIG. 3(a) includes 6 (even-numbered) PRBs and a center subcarrier of one carrier, and each PRB includes 12 subcarriers. It can be understood that, a center subcarrier is also referred to as a direct current subcarrier, a center frequency, and a direct current frequency.

Figure 3B:
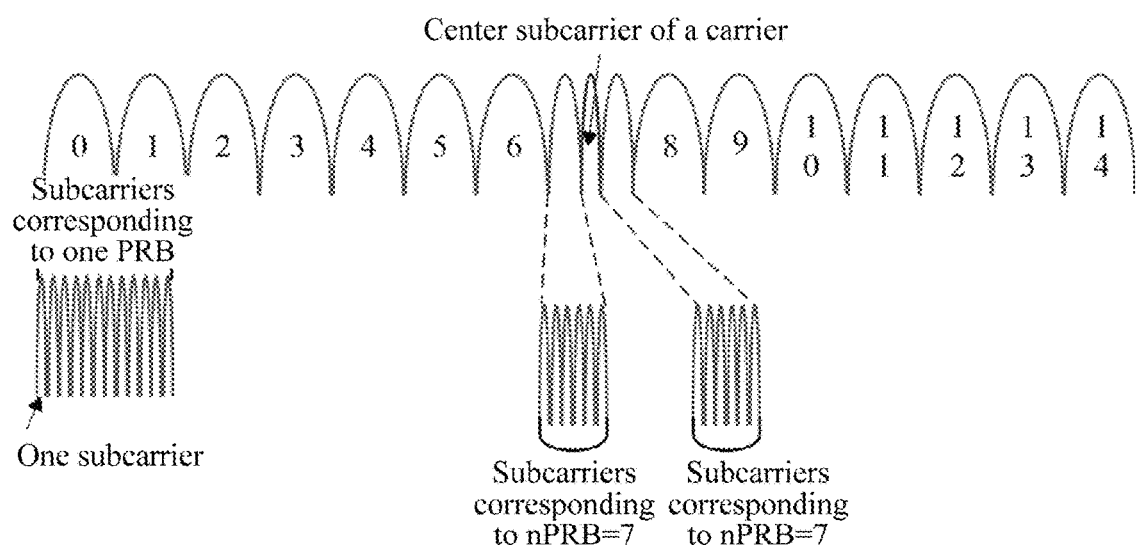
FIG. 3(b) is another schematic diagram of a subband in a method for determining a subband resource according to an embodiment of the present invention.

As shown in FIG. 3(b), a subband in FIG. 3(b) includes 15 (odd-numbered) PRBs and a center subcarrier of one carrier, and each PRB includes 12 subcarriers. Because subcarriers on two sides of the center subcarrier of the carrier are symmetrical, the eighth PRB numbered 7 is divided by the center subcarrier of the carrier into two half PRBs having an equal frequency.

It should be further noted that the subband resource information in the present invention includes particular frequency information and a first offset parameter, where the particular frequency information is used to determine the center subcarrier of the subband, and the first offset parameter is used to determine an offset of the center subcarrier of the subband.

Alternatively, the subband resource information includes a first parameter and a second parameter, where the first parameter is used to determine a location of a center subcarrier of the subband in a resource block RB, and the second parameter is used to determine the resource block RB in which the center subcarrier of the subband is located.

Alternatively, the subband resource information includes a subband determining manner and a subband index, where the subband determining manner specifies a formation manner of the subband in the bandwidth, and the subband index is a number of the subband in the bandwidth.

When the subband resource information includes the particular frequency information and the first offset parameter, the particular frequency information is one or more of a center frequency of a center subcarrier of a carrier, a center subcarrier of a carrier, a subcarrier index of a center subcarrier of a carrier, a particular subcarrier of a carrier, an index of a particular subcarrier of a carrier, a particular resource block in a carrier, an index of a particular resource block in a carrier, a particular frequency in a carrier, a location of a particular frequency in a carrier, or a particular frequency resource in a carrier; and the first offset parameter indicates one or more of a subcarrier quantity of a first offset, a value of a frequency of a first offset, or a resource block quantity of a first offset.

Figure 4:
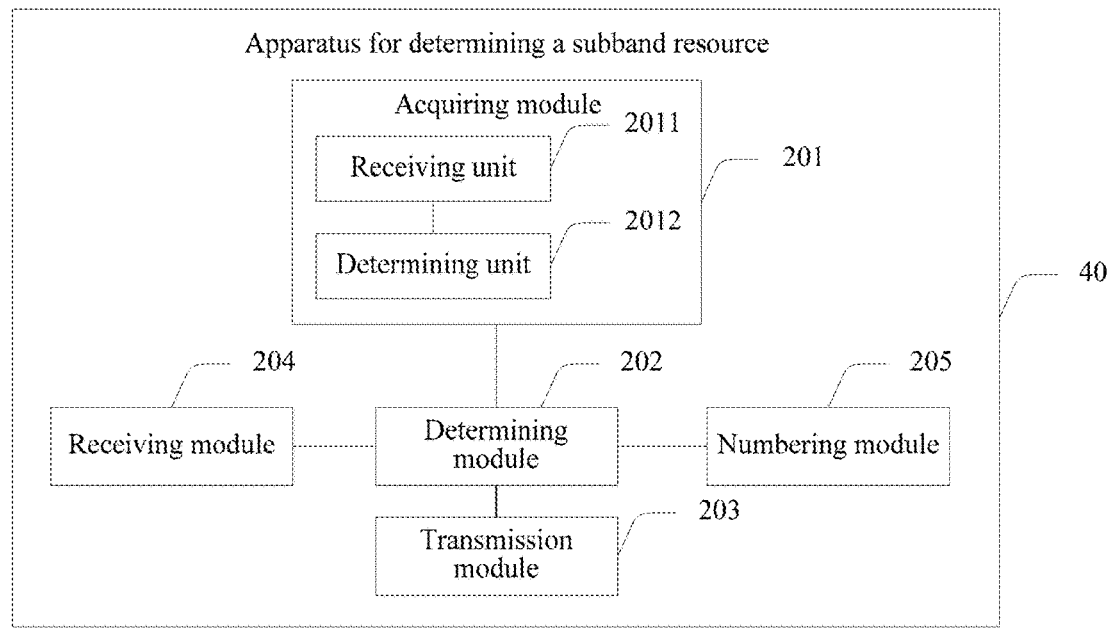
FIG. 4 is a schematic logic diagram of another apparatus for determining a subband resource according to an embodiment of the present invention.

Further optionally, as shown in FIG. 4, the present invention further provides an apparatus 40 for determining a subband resource. The apparatus 40 further includes: a receiving module 204 and a numbering module 205. An acquiring module 201 further includes a receiving unit 2011 and a determining unit 2012.

The receiving module 204 is configured to: receive first signaling sent by a base station, and provide the first signaling to a determining module 202. The first signaling is used to: indicate a first particular manner of determining the subband resource by using particular frequency information and a first offset, where the first particular manner is an addition manner or a subtraction manner; or indicate a second particular manner of determining the subband resource by using particular frequency information, a first offset, and a second offset, where the second particular manner is an addition manner or a subtraction manner. The determining module 202 determines the subband resource by using subband resource information and the first signaling.

The signaling in the present invention may be one or more of radio resource control signaling, media access control signaling, or physical layer signaling. The radio resource control signaling may be radio resource control common signaling and/or radio resource control dedicated signaling. The radio resource control common signaling may be one or more of system information, a system information block, or a primary information block. The radio resource control dedicated signaling may be specifically one or more of an initial random access response or a contention resolution message. The media access control signaling may be a control element in media access control. The physical layer signaling may be a control channel that carries control information. For example, the control channel is a control channel that schedules control information of a random access response or a control channel that schedules control information of a contention resolution message. The first signaling in the present invention and second signaling and third signaling that appear below each are one of the foregoing types of signaling.

Correspondingly, the determining module 202 is further configured to: when a quantity of resource blocks included in the bandwidth is an odd number, determine the subband resource according to the particular frequency information, the first offset parameter, and a second offset parameter, where the subband resource information further includes the second offset parameter, the second offset parameter indicates that a second offset is N subcarriers or a frequency resource width of N subcarriers, and N is an integer not equal to 0.

Further optionally, the determining module 202 is further configured to: when the subband resource information includes the first parameter and the second parameter, determine the subband resource according to the first parameter, the second parameter, and a third offset parameter, where the subband resource information further includes the third offset parameter, and the third offset parameter is used to determine an offset of a center subcarrier of a subband.

Further optionally, when the subband resource information includes the subband determining manner and the subband index, for the subband determining manner, a subband determining manner 1 or a subband determining manner 2 is used.

The subband determining manner 1: The numbering module 205 numbers subbands starting from one side of a center subcarrier of a carrier, and after the numbering on the available subbands on the side of the center subcarrier of the carrier is completed, numbers subbands from the other side of the center subcarrier of the carrier.

For example, all subbands located on the left side of the center subcarrier of the carrier (that is, a frequency resource whose frequency is less than a frequency of the center subcarrier of the carrier) of the subband resource are numbered in a sequence from a lower frequency to a higher frequency, and then all unnumbered subbands located on the right side of the center subcarrier of the carrier (that is, a frequency resource whose frequency is greater than a frequency of the center subcarrier of the carrier) of the subband resource are numbered in a sequence from a lower frequency to a higher frequency.

For another example, all subbands located on the right side of the center subcarrier of the carrier (that is, a frequency resource whose frequency is greater than a frequency of the center subcarrier of the carrier) of the subband resource are numbered in a sequence from a higher frequency to a lower frequency, and then all unnumbered subbands located on the left side of the center subcarrier of the carrier (that is, a frequency resource whose frequency is less than a frequency of the center subcarrier of the carrier) of the subband resource are numbered in a sequence from a higher frequency to a lower frequency.

The subband determining manner 2: The numbering module 205 numbers subbands starting from one side of a center subcarrier of a carrier, after numbering on one subband is completed, numbers subbands from the other side of the center subcarrier of the carrier, after numbering on one subband is completed, returns to the side of the center subcarrier of the carrier and numbers remaining subbands on the side, and after numbering on one subband is completed, returns to the other side of the center subcarrier of the carrier and numbers remaining subbands on the other side, until numbering on all available subbands on both sides of the center subcarrier of the carrier is completed.

Optionally, for any subband determining manner, if subband resources of a subband are located on two sides of the center subcarrier of the carrier, the subband is referred to as a center subband. If subband resources of a subband are not located on two sides of the center subcarrier of the carrier, the subband is referred to as a non-center subband. The center subband may be used as a first subband (that is, numbered 0), or may be numbered as a last subband, or is numbered by using a same method as a non-center subband, or is used as a default subband. The default subband is numbered 0, or the default subband does not participate in the numbering of subbands.

Further optionally, the subband resource information further includes a fourth offset parameter and/or a fifth offset parameter, where the fourth offset parameter is used to determine an offset of the subband, and the fifth offset parameter is used to determine the offset of the subband.

The determining module 202 is further configured to: determine the subband resource according to the subband determining manner, the subband index, and the fourth offset parameter; or determine the subband resource according to the subband determining manner, the subband index, and the fifth offset parameter; or determine the subband resource according to the subband determining manner, the subband index, the fourth offset parameter, and the fifth offset parameter.

In this embodiment of the present invention, a fixed value of the fourth offset parameter may be set in advance according to a system bandwidth.

For example, a manner of determining the value is:
when the system bandwidth is 1.4 MHz, the fourth offset is 0; and/or
when the system bandwidth is 3 MHz, the fourth offset is 1.5 RBs; and/or
when the system bandwidth is 5 MHz, the fourth offset is 0.5 RB; and/or
when the system bandwidth is 10 MHz, the fourth offset is 1 RB; and/or
when the system bandwidth is 15 MHz, the fourth offset is 1.5 RBs; and/or
when the system bandwidth is 20 MHz, the fourth offset is 2 RBs.

Another manner of determining the value is:
when the system bandwidth is 1.4 MHz, the fourth offset is 0; and/or
when the system bandwidth is 3 MHz, the fourth offset on the left side (or right side) of the center subcarrier of the carrier is 0, and the fourth offset on the right side (or left side) of the center subcarrier of the carrier is 3 RBs; and/or
when the system bandwidth is 5 MHz, the fourth offset on the left side (or right side) of the center subcarrier of the carrier is 0, and the fourth offset on the right side (or left side) of the center subcarrier of the carrier is 1 RB; and/or
when the system bandwidth is 10 MHz, the fourth offset on the left side (or right side) of the center subcarrier of the carrier is 0, and the fourth offset on the right side (or left side) of the center subcarrier of the carrier is 2 RBs; and/or
when the system bandwidth is 15 MHz, the fourth offset on the left side (or right side) of the center subcarrier of the carrier is 0, and the fourth offset on the right side (or left side) of the center subcarrier of the carrier is 3 RBs; and/or
when the system bandwidth is 20 MHz, the fourth offset on the left side (or right side) of the center subcarrier of the carrier is 0, and the fourth offset on the right side (or left side) of the center subcarrier of the carrier is 4 RBs.

Optionally, an RB within an offset range (including the left side and the right side of the center subcarrier of the carrier) indicated by the fourth offset does not belong to any subband.

Optionally, an RB within an offset range (including the left side and the right side of the center subcarrier of the carrier) indicated by the fourth offset may form a special subband (a quantity of RBs included in the special subband is less than a quantity of RBs included in the subband).

Optionally, for a first system bandwidth set, an RB within an offset range (including the left side and the right side of the center subcarrier of the carrier) indicated by the fourth offset may form a special subband; for a second system bandwidth set, an RB within an offset range (including the left side and the right side of the center subcarrier of the carrier) indicated by the fourth offset does not belong to any subband. A bandwidth included in the first system bandwidth set is different from a bandwidth included in the second system bandwidth set. For example, the first system bandwidth set includes system bandwidths of 3 MHz, 5 MHz, 10 MHz, 15 MHz, and 20 MHz, and the second system bandwidth set includes a system bandwidth of 1.4 MHz.

When the system bandwidth is 1.4 MHz, there is no special subband;
when the system bandwidth is 3 MHz, the special subband includes three RBs;
when the system bandwidth is 5 MHz, the special subband includes one RB;
when the system bandwidth is 10 MHz, the special subband includes two RBs;
when the system bandwidth is 15 MHz, the special subband includes three RBs; and
when the system bandwidth is 20 MHz, the special subband includes four RBs.

For another example, the first system bandwidth set includes system bandwidths of 5 MHz, 10 MHz, 15 MHz, and 20 MHz, and the second system bandwidth set includes system bandwidths of 1.4 MHz and 3 MHz.

Optionally, the fifth offset is 0. When the determined subband is a downlink subband, the fifth offset is equal to 0. When the determined subband is an uplink subband, a value of the fifth offset is set by using higher layer signaling.

It should be noted that in the present invention, if a value of an offset parameter is constantly 0, it indicates that such an offset parameter does not exist or does not need to be introduced (or defined). Moreover, in the present invention, if a carrier has a direct current subcarrier, a center subcarrier of the carrier is the direct current subcarrier of the carrier or a center frequency of the carrier. If a carrier does not have a direct current subcarrier, a center subcarrier of the carrier is a center frequency of the carrier.

Further optionally, the determining module 202 is further configured to: when the subband index is greater than and/or equal to a first threshold, determine the subband resource according to the subband resource information and a sixth offset parameter, where the subband resource information further includes the sixth offset parameter, and the sixth offset parameter is used to determine the center subcarrier of the subband; or when the subband index is less than a first threshold, determine the subband resource according to the subband resource information and a sixth offset parameter; or when the subband index is an even number, determine the subband resource according to the subband resource information and a sixth offset parameter; or when the subband index is an odd number, determine the subband resource according to the subband resource information and a sixth offset parameter.

Further optionally, when the subband resource is the subband, and when the subband includes 2M+2 subcarriers, where M is an integer greater than 0, one subcarrier of the subband is used as the center subcarrier of the subband, and the subband resource includes: the center subcarrier of the subband, M subcarriers whose frequency is less than a frequency of the center subcarrier of the subband, and M+1 subcarriers whose frequency is greater than the frequency of the center subcarrier of the subband; or the center subcarrier of the subband, M+1 subcarriers whose frequency is less than a frequency of the center subcarrier of the subband, and M subcarriers whose frequency is greater than the frequency of the center subcarrier of the subband; or two subcarriers of the subband are used as center subcarriers of the subband, and the subband resource includes: the center subcarriers of the subband, M subcarriers whose frequency is less than a frequency of a center subcarrier of the subband, and M subcarriers whose frequency is greater than the frequency of the center subcarrier of the subband.

Further optionally, the acquiring module 201 acquires the subband resource information in two manners.

A first manner: The receiving unit 2011 in the acquiring module 201 receives second signaling sent by the base station; and acquires the subband resource information from the second signaling.

A second manner: The determining unit 2012 in the acquiring module 201 determines the subband resource information in a pre-specified manner.

The pre-specified manner may be a standard manner and/or a manner specified by a system.

Further optionally, the receiving module 204 is further configured to: receive third signaling sent by the base station, and provide the third signaling to the determining module 202, where the third signaling indicates a duplex spacing between a downlink subband resource and an uplink subband resource; and when the subband resource is a downlink subband resource, the determining module 202 determines an uplink subband resource according to the downlink subband resource and the duplex spacing; or when the subband resource is an uplink subband resource, the determining module 202 determines a downlink subband resource according to the uplink subband resource and the duplex spacing.

In the present invention, the duplex spacing may be configured by using signaling or in a pre-specified manner.

In the present invention, subband resource information is acquired to determine a subband resource, so that data and/or control information can be transmitted according to the subband resource. In this case, when an operating bandwidth is less than a carrier bandwidth, it may be determined, by using the subband resource, that a particular frequency bandwidth size bandwidth in a bandwidth is a bandwidth for sending or receiving data related to UE, so that the user equipment can communicate with a base station while costs of the UE or complexity of the UE is reduced.

Figure 5:
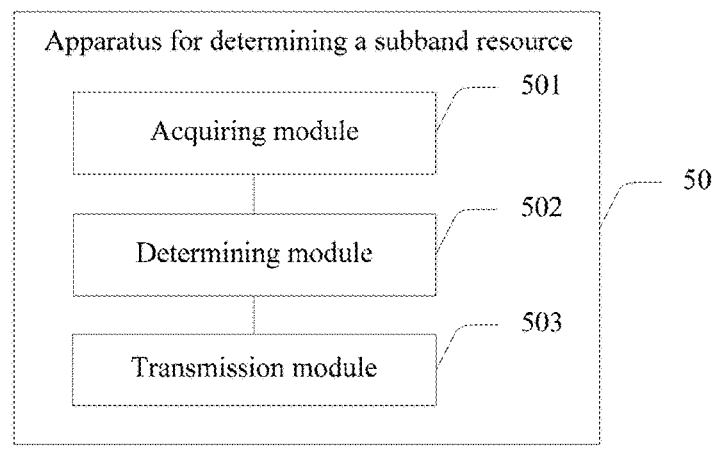
FIG. 5 is a schematic logic diagram of still another apparatus for determining a subband resource according to an embodiment of the present invention.

Optionally, as shown in FIG. 5, the present invention may further provide another apparatus 50 for determining a subband resource. The apparatus 50 is applied to a base station. A subband resource in the apparatus 50 is a resource in a subband. The subband is a frequency resource that is in a bandwidth and that has an operating bandwidth. The bandwidth is a downlink bandwidth or an uplink bandwidth. The operating bandwidth is less than the bandwidth. The apparatus 50 includes an acquiring module 501, a determining module 502, and a transmission module 503.

The acquiring module 501 is configured to: acquire subband resource information, and provide the subband resource information to the determining module 502, where the subband resource information includes information for determining a subband resource.

The determining module 502 is configured to: determine the subband resource according to the subband resource information, and provide the subband resource to the transmission module 503.

The transmission module 503 is configured to transmit data and/or control information according to the subband resource.

The present invention provides the apparatus for determining a subband resource. Compared with a problem in the prior art that communication between low-complexity UE and a base station is impeded because the low-complexity UE can only send or receive data within an operating bandwidth on a carrier, and the low-complexity UE cannot know which operating bandwidth size bandwidth in a bandwidth is a bandwidth used to transmit data related to the low-complexity UE, in the present invention, a determining module in the base station uses subband resource information acquired by an acquiring module to determine a subband resource, so that a transmission module transmits data and/or control information according to the subband resource. In this case, when an operating bandwidth is less than a carrier bandwidth, the base station may determine, by using a subband resource, that a particular frequency bandwidth size bandwidth in a bandwidth is a bandwidth for sending or receiving data related to the UE, so that the user equipment can communicate with the base station while costs of the UE or complexity of the UE is reduced.

It should be noted that the subband resource in the present invention may be a subband, or may be a center subcarrier of a subband.

It should be further noted that the subband resource information in the present invention includes particular frequency information and a first offset parameter, where the particular frequency information is used to determine the center subcarrier of the subband, and the first offset parameter is used to determine an offset of the center subcarrier of the subband.

Alternatively, the subband resource information includes a first parameter and a second parameter, where the first parameter is used to determine a location of the center subcarrier of the subband in a resource block RB, and the second parameter is used to determine the resource block RB in which the center subcarrier of the subband is located.

Alternatively, the subband resource information includes a subband determining manner and a subband index, where the subband determining manner specifies a formation manner of the subband in the bandwidth, and the subband index is a number of the subband in the bandwidth.

When the subband resource information includes the particular frequency information and the first offset parameter, the particular frequency information is one or more of a center frequency of a center subcarrier of a carrier, a center subcarrier of a carrier, a subcarrier index of a center subcarrier of a carrier, a particular subcarrier of a carrier, an index of a particular subcarrier of a carrier, a particular resource block in a carrier, an index of a particular resource block in a carrier, a particular frequency in a carrier, a location of a particular frequency in a carrier, or a particular frequency resource in a carrier; and the first offset parameter indicates one or more of a subcarrier quantity of a first offset, a value of a frequency of a first offset, or a resource block quantity of a first offset.

Figure 6:
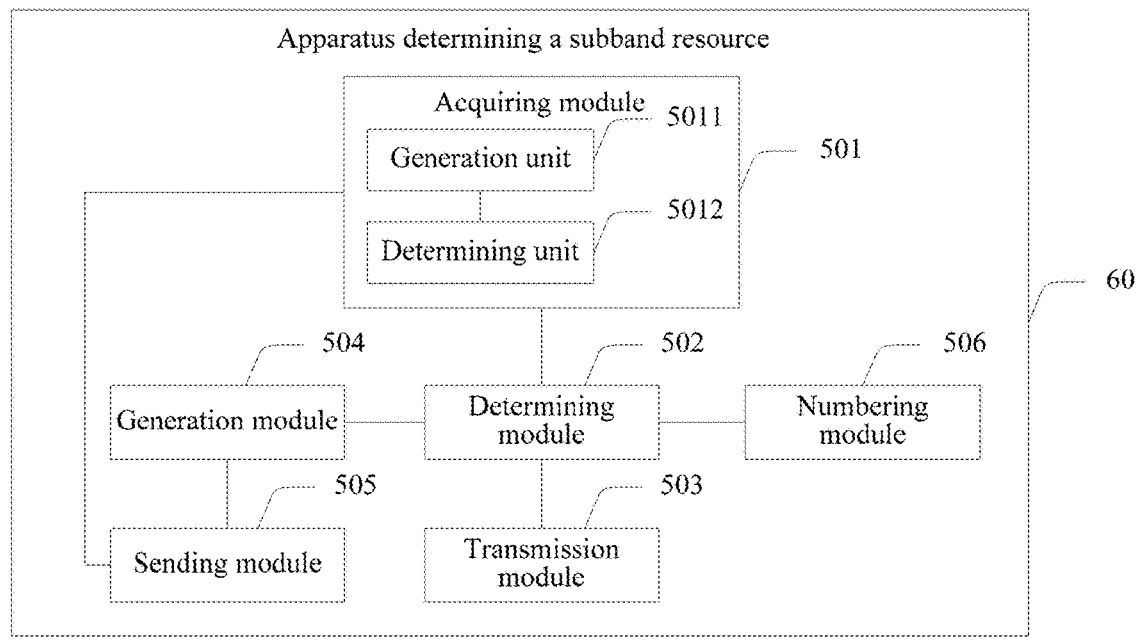
FIG. 6 is a schematic logic diagram of yet another apparatus for determining a subband resource according to an embodiment of the present invention.

Further optionally, as shown in FIG. 6, the present invention further provides an apparatus 60 for determining a subband resource. The apparatus 60 further includes a generation module 504, a sending module 505, and a numbering module 506. An acquiring module 501 includes a generation unit 5011 and a determining unit 5012.

The generation module 504 is configured to: generate, used to indicate a first particular manner of determining the subband resource by using a particular frequency information and a first offset, and/or generate, used to indicate a second particular manner of determining the subband resource by using particular frequency information, a first offset, and a second offset, where the first particular manner is an addition manner or a subtraction manner, and the second particular manner is an addition manner or a subtraction manner; and generate first signaling, where the first signaling indicates the first particular manner and/or the second particular manner.

The determining module 502 determines the subband resource according to subband resource information, the first particular manner, and/or the second particular manner.

The sending module 505 sends the first signaling to user equipment UE.

Correspondingly, the determining module 502 is further configured to: when a quantity of resource blocks included in the bandwidth is an odd number, determine the subband resource according to the particular frequency information, the first offset parameter, and a second offset parameter, where the subband resource information further includes the second offset parameter, the second offset parameter indicates that a second offset is N subcarriers or a frequency resource width of N subcarriers, and N is an integer not equal to 0.

Further optionally, the determining module 502 is further configured to: when the subband resource information includes the first parameter and the second parameter, determine the subband resource according to the first parameter, the second parameter, and a third offset parameter, where the subband resource information further includes the third offset parameter, and the third offset parameter is used to determine an offset of a center subcarrier of a subband.

Further optionally, when the subband resource information includes a subband determining manner and a subband index, for the subband determining manner, a subband determining manner 1 or a subband determining manner 2 is used.

The subband determining manner 1: The numbering module 506 numbers subbands starting from one side of a center subcarrier of a carrier, and after the numbering on the available subbands on the side of the center subcarrier of the carrier is completed, numbers subbands from the other side of the center subcarrier of the carrier.

The subband determining manner 2: The numbering module 506 numbers subbands starting from one side of a center subcarrier of a carrier, after numbering on one subband is completed, numbers subbands from the other side of the center subcarrier of the carrier, after numbering on one subband is completed, returns to the side of the center subcarrier of the carrier and numbers remaining subbands on the side, and after numbering on one subband is completed, returns to the other side of the center subcarrier of the carrier and numbers remaining subbands on the other side, until numbering on all available subbands on both sides of the center subcarrier of the carrier is completed.

Related descriptions of the subband determining manner 1 and the subband determining manner 2 are the same as related descriptions of the foregoing apparatus 40 for determining a subband resource, and details are not described herein.

Further optionally, the subband resource information further includes a fourth offset parameter and/or a fifth offset parameter, where the fourth offset parameter is used to determine an offset of the subband, and the fifth offset parameter is used to determine the offset of the subband.

The determining module 502 is further configured to: determine the subband resource according to the subband determining manner, the subband index, and the fourth offset parameter; or determine the subband resource according to the subband determining manner, the subband index, and the fifth offset parameter; or determine the subband resource according to the subband determining manner, the subband index, the fourth offset parameter, and the fifth offset parameter.

Related descriptions of the fourth offset parameter are the same as related descriptions of the foregoing apparatus 40 for determining a subband resource, and details are not described herein.

Further optionally, the determining module 502 is further configured to: when the subband index is greater than and/or equal to a first threshold, determine the subband resource according to the subband resource information and a sixth offset parameter, where the subband resource information further includes the sixth offset parameter, and the sixth offset parameter is used to determine the center subcarrier of the subband; or when the subband index is less than a first threshold, determine the subband resource according to the subband resource information and a sixth offset parameter; or when the subband index is an even number, determine the subband resource according to the subband resource information and a sixth offset parameter; or when the subband index is an odd number, determine the subband resource according to the subband resource information and a sixth offset parameter.

Further optionally, when the subband resource is the subband, and when the subband includes 2M+2 subcarriers, where M is an integer greater than 0, one subcarrier of the subband is used as the center subcarrier of the subband, and the subband resource includes: the center subcarrier of the subband, M subcarriers whose frequency is less than a frequency of the center subcarrier of the subband, and M+1 subcarriers whose frequency is greater than the frequency of the center subcarrier of the subband; or the center subcarrier of the subband, M+1 subcarriers whose frequency is less than a frequency of the center subcarrier of the subband, and M subcarriers whose frequency is greater than the frequency of the center subcarrier of the subband; or two subcarriers of the subband are used as center subcarriers of the subband, and the subband resource includes: the center subcarriers of the subband, M subcarriers whose frequency is less than a frequency of a center subcarrier of the subband, and M subcarriers whose frequency is greater than the frequency of the center subcarrier of the subband.

Further optionally, the acquiring module 501 acquires the subband resource information in two manners.

A first manner: The generation unit 5011 in the acquiring module 501 generates the subband resource information.

A second manner: The determining unit 5012 in the acquiring module 501 determines the subband resource information in a pre-specified manner.

Correspondingly, the sending module 505 sends, to the UE, second signaling carrying the subband resource information.

Further optionally, the determining module 502 is further configured to: determine a duplex spacing between a downlink subband resource and an uplink subband resource. In this case, the generation module 504 generates third signaling, and provides the third signaling to the sending module 505. The sending module 505 sends, to the UE, the third signaling carrying the duplex spacing.

In addition, the determining module 502 is further configured to: when the subband resource is a downlink subband resource, determine an uplink subband resource according to the downlink subband resource and the duplex spacing; or when the subband resource is an uplink subband resource, determine a downlink subband resource according to the downlink subband resource and the duplex spacing.

In the present invention, a base station acquires subband resource information to determine a subband resource, so that data and/or control information can be transmitted according to the subband resource. In this case, when an operating bandwidth is less than a carrier bandwidth, the base station may determine, by using the subband resource, that a particular frequency bandwidth size bandwidth in a bandwidth is a bandwidth for sending or receiving data related to UE, so that the user equipment can communicate with the base station while costs of the UE or complexity of the UE is reduced.

Figure 7:
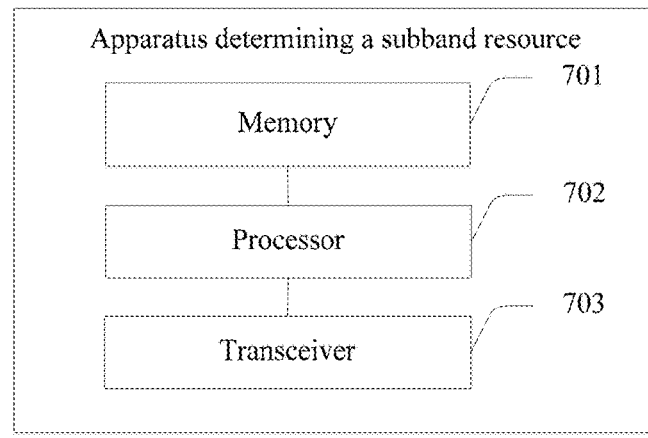
FIG. 7 is a schematic logic diagram of still yet another apparatus for determining a subband resource according to an embodiment of the present invention.

As shown in FIG. 7, the present invention further provides an apparatus for determining a subband resource. FIG. 7 is a schematic diagram of a hardware structure of UE. The UE may include a memory 701, a processor 702, and a transceiver 703.

The memory 701 may be a read-only memory (ROM), a static storage device, a dynamic storage device, or a random access memory (RAM). The memory 701 may store an operating system and another application program. When the technical solution provided in this embodiment of the present invention is implemented by using software and firmware, program code for implementing the technical solution provided in this embodiment of the present invention is stored in the memory 701, and is executed by the processor 702.

The processor 702 may be a general central processing unit (CPU), a microprocessor, an application-specific integrated circuit (ASIC), or one or more integrated circuits, and is configured to execute a related program, so as to implement the technical solution provided in this embodiment of the present invention.

The transceiver 703 is used for communication between the apparatus and another device or a communications network (for example, but not limited to, Ethernet, a radio access network (RAN), or a wireless local area network (WLAN)). It should be noted that, even though only the memory 701, the transceiver 703, and the processor 702 are shown in hardware shown in FIG. 7, in a specific implementation process, a person skilled in the art should understand that the terminal further includes another device that is essential to implement normal operation. In addition, according to a specific requirement, a person skilled in the art should understand that, the terminal may further include a hardware device for implementing another function.

Specifically, when the base station shown in FIG. 7 is configured to implement the apparatuses shown in the embodiments in FIG. 2 and FIG. 4, the processor 702 in the apparatus is configured to be coupled to the memory 701 and the transceiver 703, configured to control execution of a program instruction, and specifically configured to: acquire subband resource information, where the subband resource information includes information for determining a subband resource; and determine the subband resource according to the subband resource information.

The transceiver 703 is configured to transmit data and/or control information according to the subband resource.

The subband resource is the subband. Alternatively, the subband resource is a center subcarrier of the subband.

The subband resource information includes particular frequency information and a first offset parameter, where the particular frequency information is used to determine the center subcarrier of the subband, and the first offset parameter is used to determine an offset of the center subcarrier of the subband.

Alternatively, the subband resource information includes a first parameter and a second parameter, where the first parameter is used to determine a location of the center subcarrier of the subband in a resource block RB, and the second parameter is used to determine the resource block RB in which the center subcarrier of the subband is located.

Alternatively, the subband resource information includes a subband determining manner and a subband index, where the subband determining manner specifies a formation manner of the subband in the bandwidth, and the subband index is a number of the subband in the bandwidth.

When the subband resource information includes the particular frequency information and the first offset parameter, the particular frequency information is one or more of a center frequency of a center subcarrier of a carrier, a center subcarrier of a carrier, a subcarrier index of a center subcarrier of a carrier, a particular subcarrier of a carrier, an index of a particular subcarrier of a carrier, a particular resource block in a carrier, an index of a particular resource block in a carrier, a particular frequency in a carrier, a location of a particular frequency in a carrier, or a particular frequency resource in a carrier.

The first offset parameter indicates one or more of a subcarrier quantity of a first offset, a value of a frequency of a first offset, or a resource block quantity of a first offset.

Further optionally, the processor 702 is further configured to: when a quantity of resource blocks included in the bandwidth is an odd number, determine the subband resource according to the particular frequency information, the first offset parameter, and a second offset parameter, where the subband resource information further includes the second offset parameter, the second offset parameter indicates that a second offset is N subcarriers or a frequency resource width of N subcarriers, and N is an integer not equal to 0.

Correspondingly, the transceiver 703 is further configured to: receive first signaling sent by the base station, and provide the first signaling to the processor 702, where the first signaling is used to: indicate a first particular manner of determining the subband resource by using the particular frequency information and the first offset, where the first particular manner is an addition manner or a subtraction manner; or indicate a second particular manner of determining the subband resource by using the particular frequency information, the first offset, and the second offset, where the second particular manner is an addition manner or a subtraction manner. The processor 702 determines the subband resource by using the subband resource information and the first signaling.

Further optionally, the processor 702 is further configured to: when the subband resource information includes the first parameter and the second parameter, determine the subband resource according to the first parameter, the second parameter, and a third offset parameter, where the subband resource information further includes the third offset parameter, and the third offset parameter is used to determine the offset of the center subcarrier of the subband.

Further optionally, when the subband resource information includes the subband determining manner and the subband index, for the subband determining manner, a subband determining manner 1 or a subband determining manner 2 is used.

The subband determining manner 1: The processor 702 numbers subbands starting from one side of a center subcarrier of a carrier, and after the numbering on the available subbands on the side of the center subcarrier of the carrier is completed, numbers subbands from the other side of the center subcarrier of the carrier.

The subband determining manner 2: The processor 702 numbers subbands starting from one side of a center subcarrier of a carrier, after numbering on one subband is completed, numbers subbands from the other side of the center subcarrier of the carrier, after numbering on one subband is completed, returns to the side of the center subcarrier of the carrier and numbers remaining subbands on the side, and after numbering on one subband is completed, returns to the other side of the center subcarrier of the carrier and numbers remaining subbands on the other side, until numbering on all available subbands on both sides of the center subcarrier of the carrier is completed.

Related descriptions of the subband determining manner 1 and the subband determining manner 2 are the same as related descriptions of the foregoing apparatus 40 for determining a subband resource, and details are not described herein.

Further optionally, the subband resource information further includes a fourth offset parameter and/or a fifth offset parameter, where the fourth offset parameter is used to determine an offset of the subband, and the fifth offset parameter is used to determine the offset of the subband.

The processor 702 is further configured to: determine the subband resource according to the subband determining manner, the subband index, and the fourth offset parameter; or determine the subband resource according to the subband determining manner, the subband index, and the fifth offset parameter; or determine the subband resource according to the subband determining manner, the subband index, the fourth offset parameter, and the fifth offset parameter.

Related descriptions of the fourth offset parameter are the same as related descriptions of the foregoing apparatus 40 for determining a subband resource, and details are not described herein.

Further optionally, the processor 702 is further configured to: when the subband index is greater than and/or equal to a first threshold, determine the subband resource according to the subband resource information and a sixth offset parameter, where the subband resource information further includes the sixth offset parameter, and the sixth offset parameter is used to determine the center subcarrier of the subband; or when the subband index is less than a first threshold, determine the subband resource according to the subband resource information and a sixth offset parameter; or when the subband index is an even number, determine the subband resource according to the subband resource information and a sixth offset parameter; or when the subband index is an odd number, determine the subband resource according to the subband resource information and a sixth offset parameter.

Further optionally, when the subband resource is the subband, and when the subband includes 2M+2 subcarriers, where M is an integer greater than 0, one subcarrier of the subband is used as the center subcarrier of the subband, and the subband resource includes: the center subcarrier of the subband, M subcarriers whose frequency is less than a frequency of the center subcarrier of the subband, and M+1 subcarriers whose frequency is greater than the frequency of the center subcarrier of the subband; or the center subcarrier of the subband, M+1 subcarriers whose frequency is less than a frequency of the center subcarrier of the subband, and M subcarriers whose frequency is greater than the frequency of the center subcarrier of the subband; or two subcarriers of the subband are used as center subcarriers of the subband, and the subband resource includes: the center subcarriers of the subband, M subcarriers whose frequency is less than a frequency of a center subcarrier of the subband, and M subcarriers whose frequency is greater than the frequency of the center subcarrier of the subband.

Further optionally, the transceiver 703 is further configured to: receive second signaling sent by the base station; and acquire the subband resource information from the second signaling.

The processor 702 is further configured to determine the subband resource information in a pre-specified manner.

Further optionally, the transceiver 703 is further configured to: receive third signaling sent by the base station, and provide the third signaling to the processor 702, where the third signaling indicates a duplex spacing between a downlink subband resource and an uplink subband resource.

The processor 702 is further configured to: when the subband resource is a downlink subband resource, determine an uplink subband resource according to the downlink subband resource and the duplex spacing; or when the subband resource is an uplink subband resource, determine a downlink subband resource according to the uplink subband resource and the duplex spacing.

Optionally, a communication connection may be further performed between the memory 701, the processor 702, and the transceiver 703 by using a bus. The bus may include a path for transferring information between components (such as the memory 701, the processor 702, and the transceiver 703) of the apparatus.

In the present invention, a base station acquires subband resource information to determine a subband resource, so that data and/or control information can be transmitted according to the subband resource. In this case, when an operating bandwidth is less than a carrier bandwidth, UE may determine, by using the subband resource, that a particular frequency bandwidth size bandwidth in a bandwidth is a bandwidth for sending or receiving data related to the UE, so that the user equipment can communicate with the base station while costs of the UE or complexity of the UE is reduced.

Figure 8:
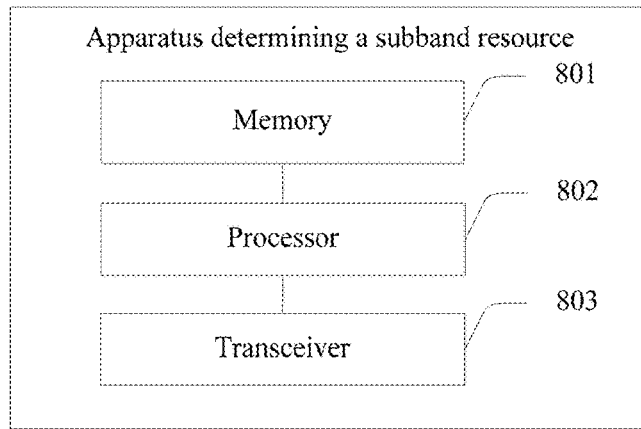
FIG. 8 is a schematic logic diagram of a further apparatus for determining a subband resource according to an embodiment of the present invention.

As shown in FIG. 8, the present invention further provides an apparatus for determining a subband resource. FIG. 8 is a schematic diagram of a hardware structure of a base station. The base station may include a memory 801, a processor 802, and a transceiver 803.

For general descriptions of common functions of the memory 801, the processor 802, and the transceiver 803 in the apparatus, refer to the descriptions of the memory 701, the processor 702, and the transceiver 703 included in the UE in FIG. 7, and details are not described one by one herein.

It should be noted that, even though only the memory 801, the processor 802, and the transceiver 803 are shown in hardware shown in FIG. 8, in a specific implementation process, a person skilled in the art should understand that the terminal further includes another device that is essential to implement normal operation. In addition, according to a specific requirement, a person skilled in the art should understand that, the terminal may further include a hardware device for implementing another function.

Specifically, when the base station shown in FIG. 8 is configured to implement the apparatuses shown in the embodiments in FIG. 5 and FIG. 6, the processor 802 in the apparatus is coupled to the memory 801 and the transceiver 803, configured to control execution of a program instruction, and specifically configured to: acquire subband resource information, where the subband resource information includes information for determining a subband resource; and determine the subband resource according to the subband resource information.

The transceiver 803 is configured to transmit data and/or control information according to the subband resource.

The subband resource is the subband. Alternatively, the subband resource is a center subcarrier of the subband.

The subband resource information includes particular frequency information and a first offset parameter, where the particular frequency information is used to determine the center subcarrier of the subband, and the first offset parameter is used to determine an offset of the center subcarrier of the subband.

Alternatively, the subband resource information includes a first parameter and a second parameter, where the first parameter is used to determine a location of the center subcarrier of the subband in a resource block RB, and the second parameter is used to determine the resource block RB in which the center subcarrier of the subband is located.

Alternatively, the subband resource information includes a subband determining manner and a subband index, where the subband determining manner specifies a formation manner of the subband in the bandwidth, and the subband index is a number of the subband in the bandwidth.

When the subband resource information includes the particular frequency information and the first offset parameter, the particular frequency information is one or more of a center frequency of a center subcarrier of a carrier, a center subcarrier of a carrier, a subcarrier index of a center subcarrier of a carrier, a particular subcarrier of a carrier, an index of a particular subcarrier of a carrier, a particular resource block in a carrier, an index of a particular resource block in a carrier, a particular frequency in a carrier, a location of a particular frequency in a carrier, or a particular frequency resource in a carrier.

The first offset parameter indicates one or more of a subcarrier quantity of a first offset, a value of a frequency of a first offset, or a resource block quantity of a first offset.

Further optionally, the processor 802 is further configured to: when a quantity of resource blocks included in the bandwidth is an odd number, determine the subband resource according to the particular frequency information, the first offset parameter, and a second offset parameter, where the subband resource information further includes the second offset parameter, the second offset parameter indicates that a second offset is N subcarriers or a frequency resource width of N subcarriers, and N is an integer not equal to 0.

Correspondingly, the processor 802 is further configured to: generate, used to indicate a first particular manner of determining the subband resource by using the particular frequency information and the first offset, and/or generate, used to indicate a second particular manner of determining the subband resource by using the particular frequency information, the first offset, and the second offset, where the first particular manner is an addition manner or a subtraction manner, and the second particular manner is an addition manner or a subtraction manner; generate first signaling, where the first signaling indicates the first particular manner and/or the second particular manner; and determine the subband resource according to the subband resource information, the first particular manner, and/or the second particular manner. The transceiver 803 sends the first signaling to the UE.

Further optionally, the processor 802 is further configured to: when the subband resource information includes the first parameter and the second parameter, determine the subband resource according to the first parameter, the second parameter, and a third offset parameter, where the subband resource information further includes the third offset parameter, and the third offset parameter is used to determine the offset of the center subcarrier of the subband.

Further optionally, when the subband resource information includes the subband determining manner and the subband index, for the subband determining manner, a subband determining manner 1 or a subband determining manner 2 is used.

The subband determining manner 1: The processor 802 numbers subbands starting from one side of a center subcarrier of a carrier, and after the numbering on the available subbands on the side of the center subcarrier of the carrier is completed, numbers subbands from the other side of the center subcarrier of the carrier.

The subband determining manner 2: The processor 802 numbers subbands starting from one side of a center subcarrier of a carrier, after numbering on one subband is completed, numbers subbands from the other side of the center subcarrier of the carrier, after numbering on one subband is completed, returns to the side of the center subcarrier of the carrier and numbers remaining subbands on the side, and after numbering on one subband is completed, returns to the other side of the center subcarrier of the carrier and numbers remaining subbands on the other side, until numbering on all available subbands on both sides of the center subcarrier of the carrier is completed.

Related descriptions of the subband determining manner 1 and the subband determining manner 2 are the same as related descriptions of the foregoing apparatus 40 for determining a subband resource, and details are not described herein.

Further optionally, the subband resource information further includes a fourth offset parameter and/or a fifth offset parameter, where the fourth offset parameter is used to determine an offset of the subband, and the fifth offset parameter is used to determine the offset of the subband.

The processor 802 is further configured to: determine the subband resource according to the subband determining manner, the subband index, and the fourth offset parameter; or determine the subband resource according to the subband determining manner, the subband index, and the fifth offset parameter; or determine the subband resource according to the subband determining manner, the subband index, the fourth offset parameter, and the fifth offset parameter.

Related descriptions of the fourth offset parameter are the same as related descriptions of the foregoing apparatus 40 for determining a subband resource, and details are not described herein.

Further optionally, the processor 802 is further configured to: when the subband index is greater than and/or equal to a first threshold, determine the subband resource according to the subband resource information and a sixth offset parameter, where the subband resource information further includes the sixth offset parameter, and the sixth offset parameter is used to determine the center subcarrier of the subband; or when the subband index is less than a first threshold, the base station determines the subband resource according to the subband resource information and a sixth offset parameter; or when the subband index is an even number, determine the subband resource according to the subband resource information and a sixth offset parameter; or when the subband index is an odd number, determine the subband resource according to the subband resource information and a sixth offset parameter.

Further optionally, when the subband resource is the subband, and when the subband includes 2M+2 subcarriers, one subcarrier of the subband is used as the center subcarrier of the subband, and the subband resource includes: the center subcarrier of the subband, M subcarriers whose frequency is less than a frequency of the center subcarrier of the subband, and M+1 subcarriers whose frequency is greater than the frequency of the center subcarrier of the subband; or the center subcarrier of the subband, M+1 subcarriers whose frequency is less than a frequency of the center subcarrier of the subband, and M subcarriers whose frequency is greater than the frequency of the center subcarrier of the subband; or two subcarriers of the subband are used as center subcarriers of the subband, and the subband resource includes: the center subcarriers of the subband, M subcarriers whose frequency is less than a frequency of a center subcarrier of the subband, and M subcarriers whose frequency is greater than the frequency of the center subcarrier of the subband.

Further optionally, the processor 802 is further configured to: generate the subband resource information; and determine the subband resource information in a pre-specified manner.

The transceiver 803 is further configured to send, to the UE, second signaling carrying the subband resource information.

Further optionally, the processor 802 is further configured to: determine a duplex spacing between a downlink subband resource and an uplink subband resource; and generate third signaling, and provide the third signaling to the transceiver.

The transceiver 803 is further configured to send, to the UE, the third signaling carrying the duplex spacing.

The processor 802 is further configured to: when the subband resource is a downlink subband resource, determine an uplink subband resource according to the downlink subband resource and the duplex spacing; or when the subband resource is an uplink subband resource, determine a downlink subband resource according to the downlink subband resource and the duplex spacing.

Optionally, a communication connection may be further performed between the memory 801, the processor 802, and the transceiver 803 by using a bus. The bus may include a path for transferring information between components (such as the memory 801, the processor 802, and the transceiver 803) in the apparatus.

In the present invention, a base station acquires subband resource information to determine a subband resource, so that data and/or control information can be transmitted according to the subband resource. In this case, when an operating bandwidth is less than a carrier bandwidth, the base station may determine, by using the subband resource, that a particular frequency bandwidth size bandwidth in a bandwidth is a bandwidth for sending or receiving data related to UE, so that the user equipment can communicate with the base station while costs of the UE or complexity of the UE is reduced.

Figure 9:
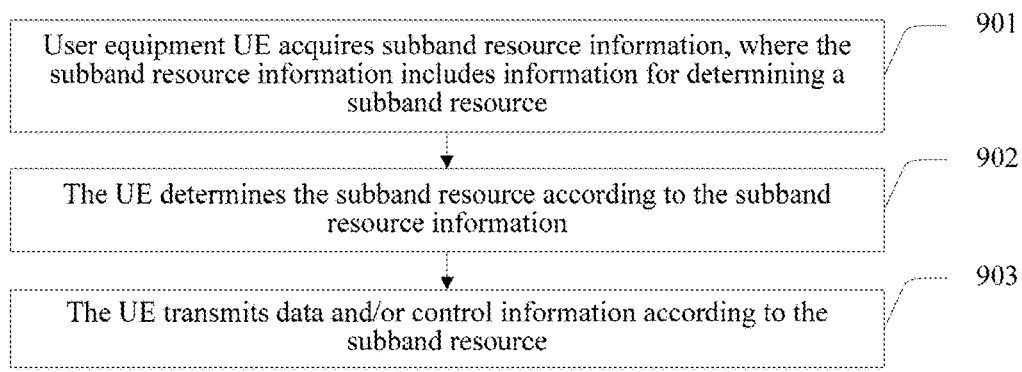
FIG. 9 is a flowchart of a method for determining a subband resource according to an embodiment of the present invention.

As shown in FIG. 9, an embodiment of the present invention provides a method for determining a subband resource. The method is applied to UE. A subband resource in the method is a resource in a subband. The subband is a frequency resource that is in a bandwidth and that has an operating bandwidth. The bandwidth is a downlink bandwidth or an uplink bandwidth. The operating bandwidth is less than the bandwidth. Details are as follows:

901: The UE acquires subband resource information, where the subband resource information includes information for determining the subband resource.

902: The UE determines the subband resource according to the subband resource information.

903: The UE transmits data and/or control information according to the subband resource.

The present invention provides the method for determining a subband resource. Compared with a problem in the prior art that communication between low-complexity UE and a base station is impeded because the low-complexity UE can only send or receive data within an operating bandwidth on a carrier, and the low-complexity UE cannot know which operating bandwidth size bandwidth in a bandwidth is a bandwidth used to transmit data related to the low-complexity UE, in the present invention, UE acquires subband resource information to determine a subband resource, so that data and/or control information can be transmitted according to the subband resource. In this case, when an operating bandwidth is less than a carrier bandwidth, the UE may determine, by using the subband resource, that a particular frequency bandwidth size bandwidth in a bandwidth is a bandwidth for sending or receiving data related to the UE, so that the user equipment can communicate with the base station while costs of the UE or complexity of the UE is reduced.

It should be further noted that the subband resource information in step 901 may include particular frequency information and a first offset parameter, where the particular frequency information is used to determine the center subcarrier of the subband, and the first offset parameter is used to determine an offset of the center subcarrier of the subband.

The particular frequency information is one or more of a center frequency of a center subcarrier of a carrier, a center subcarrier of a carrier, a subcarrier index of a center subcarrier of a carrier, a particular subcarrier of a carrier, an index of a particular subcarrier of a carrier, a particular resource block in a carrier, an index of a particular resource block in a carrier, a particular frequency in a carrier, a location of a particular frequency in a carrier, or a particular frequency resource in a carrier. For ease of description, a center subcarrier of a carrier is used as an example of the particular frequency information in the present invention for description.

For example, a particular subcarrier of the carrier is a subcarrier whose index is $N_{DL}^{PBB} \times (N_{RB}^{SC}/2)$, or a subcarrier whose index is $N_{DL}^{PBB} \times (N_{RB}^{SC}/2)-1$. A particular RB in the carrier is an RB whose index is $N_{DL}^{PBB}/2$, or an RB whose index is $(N_{DL}^{PBB}/2)-1$, or an RB whose index is 0, or an RB whose index is $N_{DL}^{PBB}-1$.

The first offset parameter indicates one or more of a subcarrier quantity of a first offset, a value of a frequency of a first offset, or a resource block quantity of a first offset. The first offset size may be configured by using signaling, or is determined by using a subband index.

Further optionally, the subband resource information may further include a second offset parameter. The second offset parameter indicates that a second offset is N subcarriers or a frequency resource width of N subcarriers, where N is an integer not equal to 0. For example, when one RB includes 12 subcarriers, N may be any one of 5, 6, or 7.

Generally, the second offset parameter is applied to a scenario in which a quantity of resource blocks included in the bandwidth is an odd number. To effectively use a subcarrier of a carrier, a boundary of each RB in a subband needs to be consistent with a boundary of an RB in a carrier, so that a quantity of subcarriers that cannot be used can be reduced.

Further optionally, in another embodiment of the present invention, the present invention may further include: receiving, by UE, first signaling sent by a base station, where the first signaling is used to indicate a first particular manner of determining the subband resource by using the particular frequency information and the first offset, and the first particular manner is an addition manner or a subtraction manner. Alternatively, the first signaling is used to indicate a second particular manner of determining the subband resource by using the particular frequency information, the first offset, and the second offset, and the second particular manner is an addition manner or a subtraction manner.

The first particular manner may be represented as information such as a plus sign or a minus sign or an identifier that denotes a plus sign/minus sign. The first signaling may further include a subband index.

When the first particular manner is information such as a plus sign or a minus sign or a particular identifier that denotes a plus sign/minus sign, the UE may directly determine, in the first particular manner, an addition relationship or a subtraction relationship between the particular frequency information and the first offset. When the first signaling includes a subband index, the UE needs to determine, by using the subband index, an addition relationship or a subtraction relationship between the frequency information and the first offset. After determining an addition relationship or a subtraction relationship between the particular frequency information and the first offset, the UE can further determine the subband resource.

Similarly, the second particular manner and the first particular manner have the same meaning. A difference lies in that the second particular manner is used to determine an addition relationship or a subtraction relationship among the particular frequency information, the first offset, and the second offset. Therefore, details are not described one by one herein.

Figure 10A:
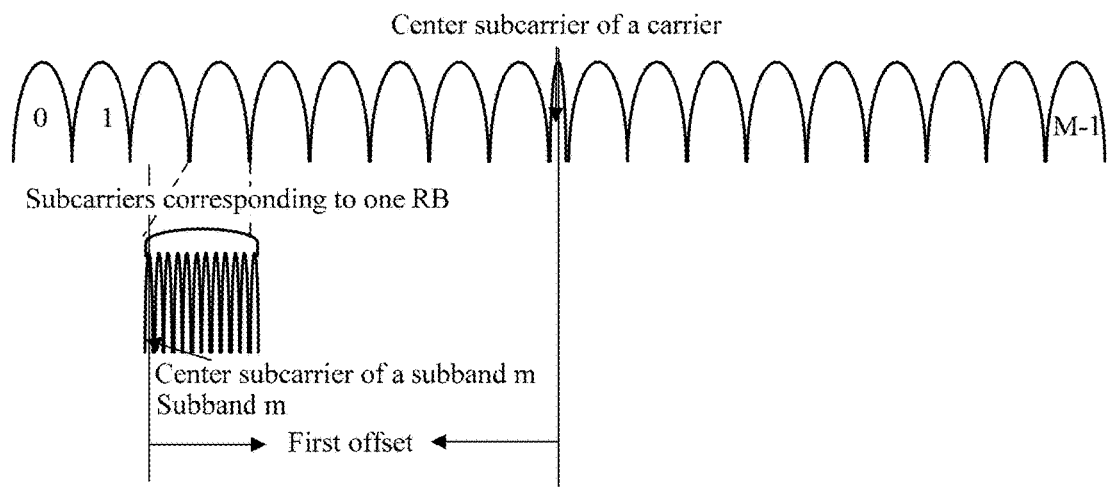
FIG. 10(a) is a schematic diagram of a method for determining a subband resource according to an embodiment of the present invention.

Correspondingly, when a quantity of RBs included in the bandwidth is an even number, the subband resource is determined according to the particular frequency information and the first offset parameter, as shown in FIG. 10(a).

The UE first determines a center subcarrier of a carrier by using particular frequency information, obtains a first particular manner by using first signaling, and then determines, according to the first particular manner, that a subcarrier obtained by offsetting (subtracting) the first offset from the center subcarrier of the carrier is the center subcarrier of the subband.

Figure 10B:
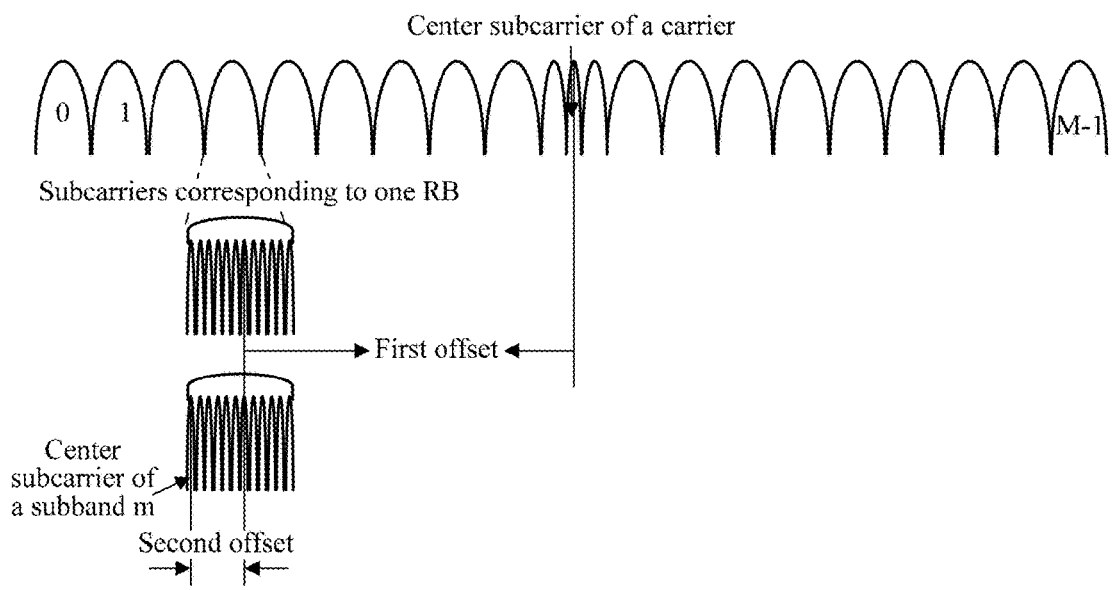
FIG. 10(b) is a schematic diagram of another method for determining a subband resource according to an embodiment of the present invention.

When a quantity of RBs included in the bandwidth is an odd number, the subband resource is determined according to the particular frequency information, the first offset parameter, and the second offset parameter, as shown in FIG. 10(b).

The UE first determines, by using particular frequency information, the center subcarrier of the carrier, obtains a second particular manner by using first signaling, and then determines, according to a first particular manner, that a subcarrier obtained by offsetting (subtracting) the first offset and then offsetting (subtracting) the second offset from the center subcarrier of the carrier is the center subcarrier of the subband.

Further optionally, when the subband resource is the subband, the UE can determine the center subcarrier of the subband by using the particular frequency information, the first offset parameter, and/or the second offset parameter that are in the subband resource information. Next, the UE needs to determine the subband. The UE may know a quantity of subcarriers included in the subband. Therefore, after the center subcarrier of the subband is determined, the subband is determined by using the quantity of subcarriers included in the subband.

The subband resource (subband) is determined in multiple manners, and three more manners are listed. It is assumed that a subband includes 2M+2 subcarriers, where M is an integer greater than 0.

Figure 11A:
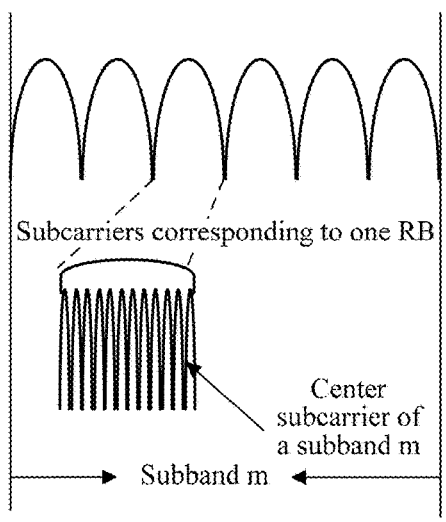
FIG. 11(a) is a schematic diagram of determining a subband in a method for determining a subband resource according to an embodiment of the present invention.

A first manner: When one subcarrier of the subband is used as a center subcarrier of the subband, the subband resource (subband) may include: the center subcarrier of the subband, M subcarriers whose frequency is less than a frequency of the center subcarrier of the subband, and M+1 subcarriers whose frequency is greater than the frequency of the center subcarrier of the subband. As shown in FIG. 11(a), it is assumed that the subband includes 72 subcarriers. It may be obtained, in the first manner, that the subband m includes 35 subcarriers whose frequency is less than a frequency of a center subcarrier of the subband m, 36 subcarriers whose frequency is greater than the frequency of the center subcarrier of the subband m, and the center subcarrier of the subband m.

Figure 11B:
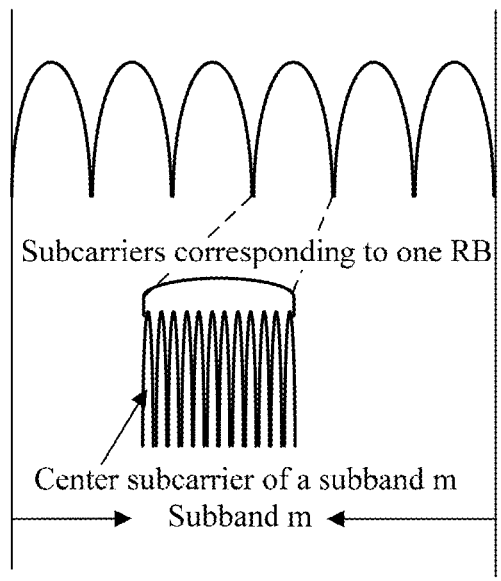
FIG. 11(b) is another schematic diagram of determining a subband in a method for determining a subband resource according to an embodiment of the present invention.

A second manner: When one subcarrier of the subband is used as a center subcarrier of the subband, the subband resource (subband) may alternatively include: alternatively, the center subcarrier of the subband, M+1 subcarriers whose frequency is less than a frequency of the center subcarrier of the subband, and M subcarriers whose frequency is greater than the frequency of the center subcarrier of the subband. As shown in FIG. 11(b), it is assumed that the subband includes 72 subcarriers. It may be obtained, in the second manner, that the subband m includes 36 subcarriers whose frequency is less than a frequency of a center subcarrier of the subband m, 35 subcarriers whose frequency is greater than the frequency of the center subcarrier of the subband m, and the center subcarrier of the subband m.

Figure 11C:
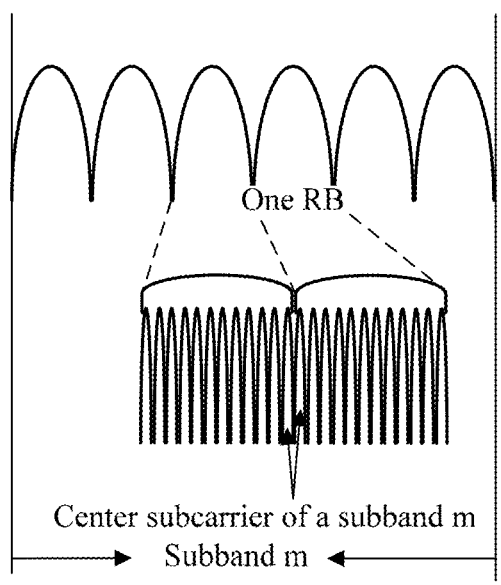
FIG. 11(c) is still another schematic diagram of determining a subband in a method for determining a subband resource according to an embodiment of the present invention.

A third manner: When two subcarriers of the subband are used as center subcarriers of the subband, the subband resource (subband) may include: the center subcarriers of the subband, M subcarriers whose frequency is less than a frequency of a center subcarrier of the subband, and M subcarriers whose frequency is greater than the frequency of the center subcarrier of the subband. As shown in FIG. 11(c), it is assumed that the subband includes 72 subcarriers. It may be obtained, in the third manner, that the subband m includes 35 subcarriers whose frequency is less than a frequency of one center subcarrier of the subband m, 35 subcarriers whose frequency is greater than the frequency of the center subcarrier of the subband m, and two center subcarriers of the subband m.

Optionally, the subband resource information in step 901 includes a first parameter and a second parameter, where the first parameter is used to determine a location of the center subcarrier of the subband in a resource block RB, and the second parameter is used to determine the resource block RB in which the center subcarrier of the subband is located.

The first parameter indicates which subcarrier is used as the center subcarrier of the subband. One subcarrier or multiple subcarriers may be used as the center subcarrier of the subband. The first parameter includes one or more bits.

In the present invention, one of a subcarrier $k_1$ or a subcarrier $k_2$ may be preset as the center subcarrier of the subband. The subcarrier k1 and the subcarrier k2 are different subcarriers. For example, the subcarrier k1 is the first subcarrier in an RB, and the subcarrier k2 is the last subcarrier in the RB. Alternatively, the subcarrier k1 is the sixth subcarrier in an RB, and the subcarrier k2 is the seventh subcarrier in the RB. Alternatively, when a quantity of RBs included in the bandwidth is an even number, the subcarrier k1 is the first subcarrier in an RB, and the subcarrier k2 is the last subcarrier in the RB. When a quantity of RBs included in the bandwidth is an odd number, the subcarrier k1 is the sixth subcarrier in the RB, and the subcarrier k2 is the seventh subcarrier in the RB.

Optionally, the first parameter includes one bit. A bit state of the first parameter may be 0 and 1.0 (or 1) represents that the subcarrier k1 is the center subcarrier of the subband. A bit state 1 (or 0) of the first parameter represents that the subcarrier k2 in the determined RB is the center subcarrier of the subband.

Further optionally, the subband resource information further includes a third offset parameter, and the third offset parameter is used to determine the offset of the center subcarrier of the subband.

The third offset parameter is marked as $offset_3$, and $offset_3$ may be a fixed constant. For example, $offset_3=1$ or $offset_3=-1$.

Optionally, the first parameter includes two bits. A bit state of the first parameter may be 00, 01, 10, or 11.00 represents that the subcarrier k1 is the center subcarrier of the subband, 01 represents that the subcarrier k2 is the center subcarrier of the subband, 10 represents that the subcarrier k1 and the subcarrier k1 minus $offset_3$ are the center subcarriers of the subband, and 11 represents that the subcarrier k2 and the subcarrier k2 plus $offset_3$ are the center subcarriers of the subband.

The second parameter indicates an RB in which the center subcarrier of the subband is located. The second parameter may indicate which RB of $N_{RB}$ RBs is the RB in which the center subcarrier of the subband is located. The center subcarrier of the subband may be located in one or more RBs. $N_{RB}=N_{DL}^{RB}$, and $N_{DL}^{RB}$ is the quantity of RBs included in the carrier or the subband. Alternatively, $N_{RB}$ is a preset integer. For example, $N_{DL}^{RB}=100$, and $N_{RB}=100$. The second parameter may include seven bits. The second parameter may indicate which RB of 100 RBs is the RB in which the center subcarrier of the subband is located. For another example, $N_{DL}^{RB}=100$, but $N_{RB}=16$. The 16 RBs are 16 particular RBs of the 100 RBs. The second parameter may include four bits, and the second parameter may indicate which RB of the 16 RBs is the RB in which the center subcarrier of the subband is located.

Figure 12:
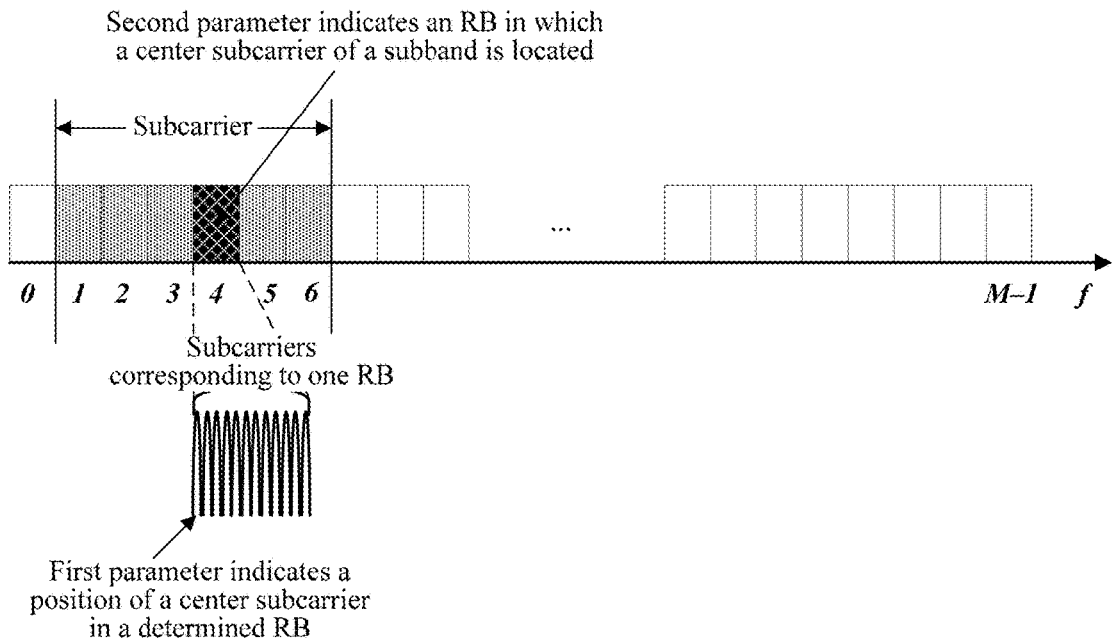
FIG. 12 is a schematic diagram of still another method for determining a subband resource according to an embodiment of the present invention.

As shown in FIG. 12, the first parameter indicates that the first subcarrier in the determined RB is the center subcarrier of the subband. The second parameter indicates that the RB in which the center subcarrier of the subband is located is an RB whose index is 4, that is, the determined RB is an RB whose index is 4. In this case, the UE determines that the center subcarrier of the subband is the first subcarrier in the RB whose index is 4.

Optionally, the subband resource information in step 901 includes a subband determining manner and a subband index, where the subband determining manner specifies a formation manner of the subband in the bandwidth, and the subband index is a number of the subband in the bandwidth.

In the present invention, the subband is determined in multiple manners. Several of the manners are listed herein.

Figure 13A:
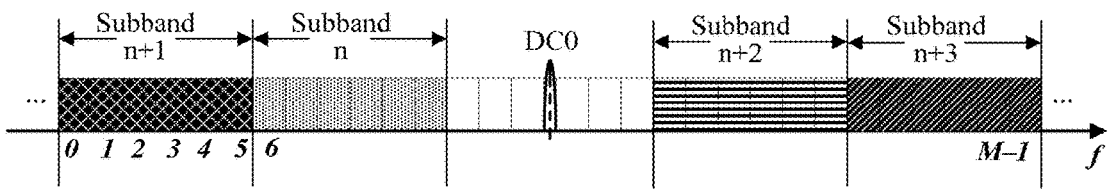
FIG. 13(a) is a schematic diagram of numbering a subband in a method for determining a subband resource according to an embodiment of the present invention.
Figure 13B:
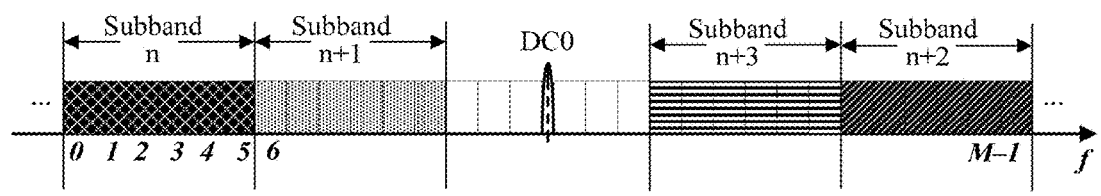
FIG. 13(b) is another schematic diagram of numbering a subband in a method for determining a subband resource according to an embodiment of the present invention.

A subband determining manner 1: The UE numbers subbands starting from one side of a center subcarrier of a carrier, and after the numbering on the available subbands on the side of the center subcarrier of the carrier is completed, numbers subbands from the other side of the center subcarrier of the carrier. As shown in FIG. 13(a) or as shown in FIG. 13(b), DC0 is the center subcarrier of the carrier. FIG. 13(a)/FIG. 13(b) shows four subbands, where each subband includes six RBs. In FIG. 13(a), a subband near DC0 starts to be numbered. In FIG. 13(b), a subband far away from DC0 starts to be numbered.

For example, all subbands located on the left side of the center subcarrier of the carrier (that is, a frequency resource whose frequency is less than a frequency of the center subcarrier of the carrier) of the subband resource are numbered in a sequence from a lower frequency to a higher frequency, and then all unnumbered subbands located on the right side of the center subcarrier of the carrier (that is, a frequency resource whose frequency is greater than a frequency of the center subcarrier of the carrier) of the subband resource are numbered in a sequence from a lower frequency to a higher frequency.

For another example, all subbands located on the right side of the center subcarrier of the carrier (that is, a frequency resource whose frequency is greater than a frequency of the center subcarrier of the carrier) of the subband resource are numbered in a sequence from a higher frequency to a lower frequency, and then all unnumbered subbands located on the left side of the center subcarrier of the carrier (that is, a frequency resource whose frequency is less than a frequency of the center subcarrier of the carrier) of the subband resource are numbered in a sequence from a higher frequency to a lower frequency.

Figure 13C:
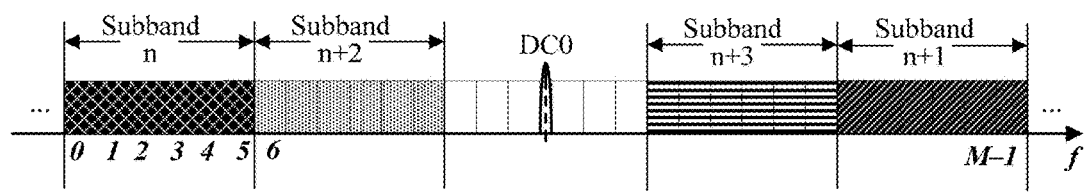
FIG. 13(c) is still another schematic diagram of numbering a subband in a method for determining a subband resource according to an embodiment of the present invention.
Figure 13D:
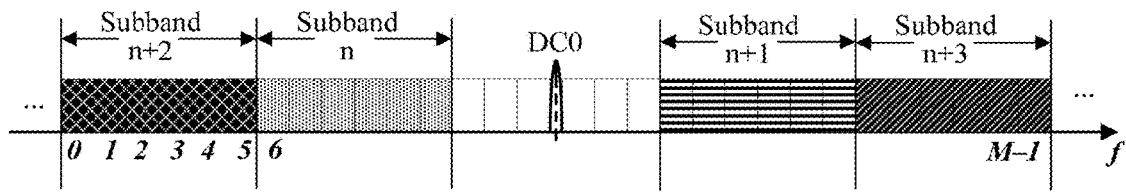
FIG. 13(d) is yet another schematic diagram of numbering a subband in a method for determining a subband resource according to an embodiment of the present invention.

A subband determining manner 2: The UE numbers subbands starting from one side of a center subcarrier of a carrier, after numbering on one subband is completed, numbers subbands from the other side of the center subcarrier of the carrier, after numbering on one subband is completed, returns to the side of the center subcarrier of the carrier and numbers remaining subbands on the side, and after numbering on one subband is completed, returns to the other side of the center subcarrier of the carrier and numbers remaining subbands on the other side, until numbering on all available subbands on both sides of the center subcarrier of the carrier is completed. As shown in FIG. 13(c) or as shown in FIG. 13(d), DC0 is the center subcarrier of the carrier. FIG. 13(c)/FIG. 13(d) shows four subbands, where each subband includes six RBs. Similarly, in FIG. 13(c), a subband near DC0 starts to be numbered. In FIG. 13(d), a subband far away from DC0 starts to be numbered.

Further optionally, in the present invention, different subbands may be allowed to have an overlapped RB, as shown in FIG. 14(a), FIG. 14(b), FIG. 14(c), and FIG. 14(d).

Figure 14A:
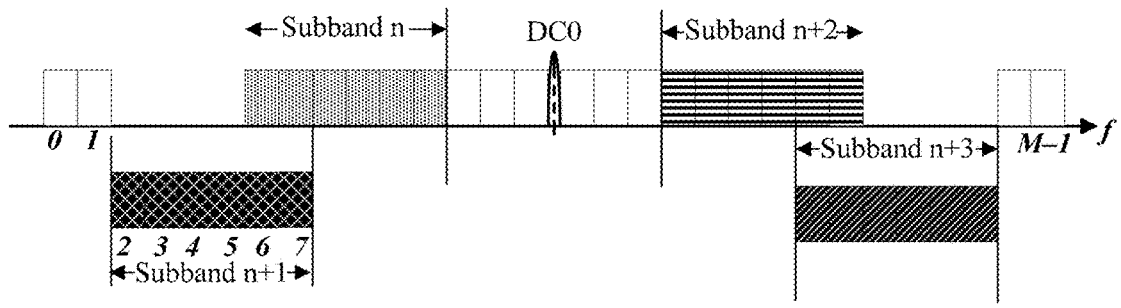
FIG. 14(a) is a schematic diagram of numbering a subband of subbands that can be overlapped in a method for determining a subband resource according to an embodiment of the present invention.
Figure 14B:
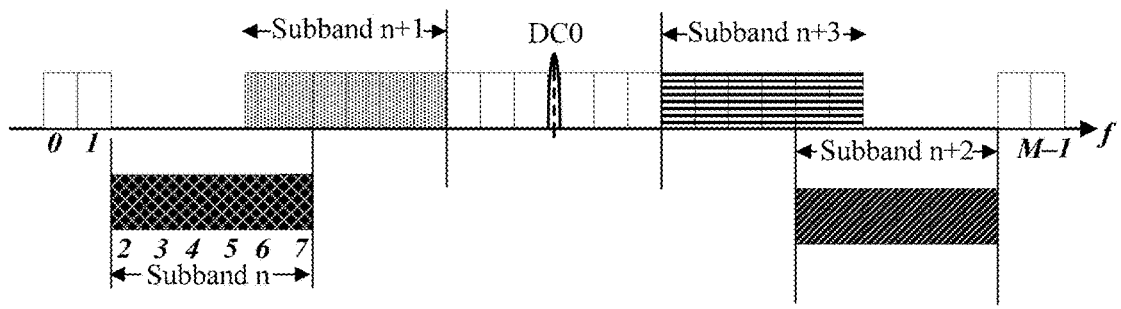
FIG. 14(b) is another schematic diagram of numbering a subband of subbands that can be overlapped in a method for determining a subband resource according to an embodiment of the present invention.
Figure 14C:
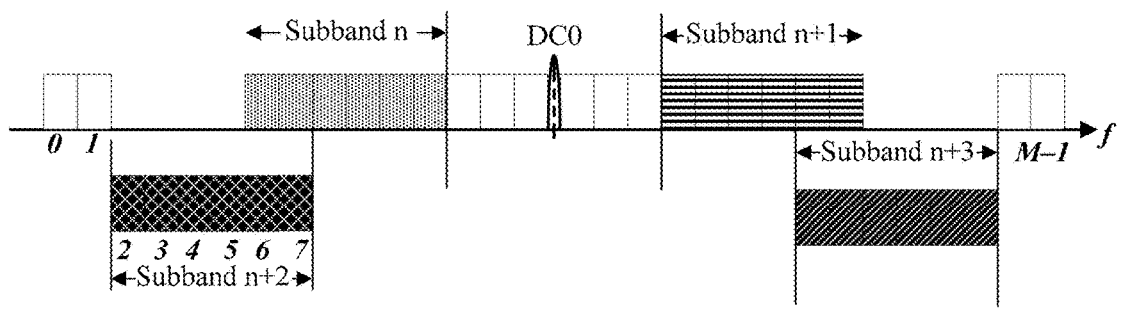
FIG. 14(c) is still another schematic diagram of numbering a subband of subbands that can be overlapped in a method for determining a subband resource according to an embodiment of the present invention.
Figure 14D:
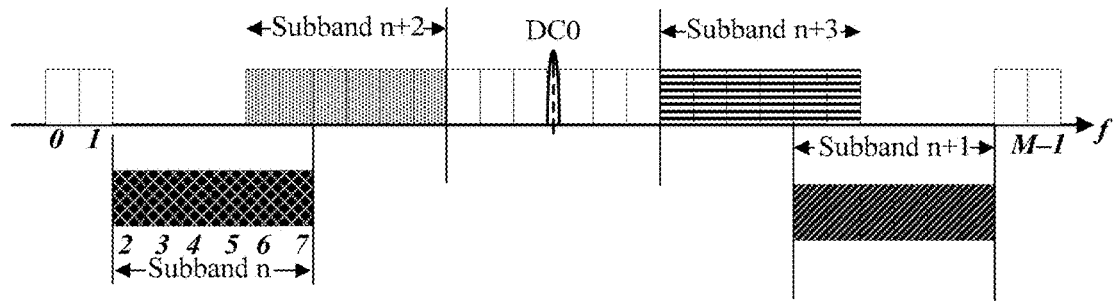
FIG. 14(d) is yet another schematic diagram of numbering a subband of subbands that can be overlapped in a method for determining a subband resource according to an embodiment of the present invention.

Similarly, in FIG. 14(a), FIG. 14(b), FIG. 14(c), and FIG. 14(d), DC0 is the center subcarrier of the carrier, and each subband includes six RBs. FIG. 14(a) corresponds to FIG. 13(a), FIG. 14(b) corresponds to FIG. 13(b), FIG. 14(c) corresponds to FIG. 13(c), and FIG. 14(d) corresponds to FIG. 13(d).

Optionally, for any subband determining manner, if subband resources of a subband are located on two sides of the center subcarrier of the carrier, the subband is referred to as a center subband. If subband resources of a subband are not located on two sides of the center subcarrier of the carrier, the subband is referred to as a non-center subband. The center subband may be used as a first subband (that is, numbered 0), or may be numbered as a last subband, or is numbered by using a same method as a non-center subband, or is used as a default subband. The default subband is numbered 0, or the default subband does not participate in the numbering of subbands.

Further optionally, the subband resource information further includes a fourth offset parameter and/or a fifth offset parameter, where the fourth offset parameter is used to determine an offset of the subband, and the fifth offset parameter is used to determine the offset of the subband. Correspondingly, in step 902, the UE may determine the subband resource according to the subband determining manner, the subband index, and the fourth offset parameter. Alternatively, the UE may determine the subband resource according to the subband determining manner, the subband index, the fourth offset parameter, and the fifth offset parameter.

The fourth offset parameter may have multiple different meanings, and a value of the fourth offset parameter may be a fixed value or is configured by using signaling. The fourth offset parameter indicates an offset between the fourth offset and the center frequency of the center subcarrier of the carrier, or indicates an offset between the fourth offset and the center subcarrier of the carrier, or indicates an offset between the fourth offset and a particular RB, or indicates an offset of the fourth offset subband. Similarly, the fifth offset parameter and the fourth offset parameter have the same attribute, but are different in use range.

In this embodiment of the present invention, a fixed value of the fourth offset parameter may be set in advance according to a system bandwidth.

For example, a manner of determining the value is:
when the system bandwidth is 1.4 MHz, the fourth offset is 0; and/or
when the system bandwidth is 3 MHz, the fourth offset is 1.5 RBs; and/or
when the system bandwidth is 5 MHz, the fourth offset is 0.5 RB; and/or
when the system bandwidth is 10 MHz, the fourth offset is 1 RB; and/or
when the system bandwidth is 15 MHz, the fourth offset is 1.5 RBs; and/or
when the system bandwidth is 20 MHz, the fourth offset is 2 RBs.

Another manner of determining the value is:
when the system bandwidth is 1.4 MHz, the fourth offset is 0; and/or
when the system bandwidth is 3 MHz, the fourth offset on the left side (or right side) of the center subcarrier of the carrier is 0, and the fourth offset on the right side (or left side) of the center subcarrier of the carrier is 3 RBs; and/or
when the system bandwidth is 5 MHz, the fourth offset on the left side (or right side) of the center subcarrier of the carrier is 0, and the fourth offset on the right side (or left side) of the center subcarrier of the carrier is 1 RB; and/or
when the system bandwidth is 10 MHz, the fourth offset on the left side (or right side) of the center subcarrier of the carrier is 0, and the fourth offset on the right side (or left side) of the center subcarrier of the carrier is 2 RBs; and/or
when the system bandwidth is 15 MHz, the fourth offset on the left side (or right side) of the center subcarrier of the carrier is 0, and the fourth offset on the right side (or left side) of the center subcarrier of the carrier is 3 RBs; and/or
when the system bandwidth is 20 MHz, the fourth offset on the left side (or right side) of the center subcarrier of the carrier is 0, and the fourth offset on the right side (or left side) of the center subcarrier of the carrier is 4 RBs.

Optionally, an RB within an offset range (including the left side and the right side of the center subcarrier of the carrier) indicated by the fourth offset does not belong to any subband.

Optionally, an RB within an offset range (including the left side and the right side of the center subcarrier of the carrier) indicated by the fourth offset may form a special subband (a quantity of RBs included in the special subband is less than a quantity of RBs included in the subband).

Optionally, for a first system bandwidth set, an RB within an offset range (including the left side and the right side of the center subcarrier of the carrier) indicated by the fourth offset may form a special subband. For a second system bandwidth set, an RB within an offset range (including the left side and the right side of the center subcarrier of the carrier) indicated by the fourth offset does not belong to any subband. A bandwidth included in the first system bandwidth set is different from a bandwidth included in the second system bandwidth set. For example, the first system bandwidth set includes system bandwidths of 3 MHz, 5 MHz, 10 MHz, 15 MHz, and 20 MHz, and the second system bandwidth set includes a system bandwidth of 1.4 MHz.

When the system bandwidth is 1.4 MHz, there is no special subband;
when the system bandwidth is 3 MHz, the special subband includes three RBs;
when the system bandwidth is 5 MHz, the special subband includes one RB;
when the system bandwidth is 10 MHz, the special subband includes two RBs;
when the system bandwidth is 15 MHz, the special subband includes three RBs; and
when the system bandwidth is 20 MHz, the special subband includes four RBs.

For another example, the first system bandwidth set includes system bandwidths of 5 MHz, 10 MHz, 15 MHz, and 20 MHz, and the second system bandwidth set includes system bandwidths of 1.4 MHz and 3 MHz.

Optionally, the fifth offset is 0. When the determined subband is a downlink subband, the fifth offset is equal to 0. When the determined subband is an uplink subband, a value of the fifth offset is set by using higher layer signaling.

It should be noted that in the present invention, if a value of an offset parameter is constantly 0, it indicates that such an offset parameter does not exist or does not need to be introduced (or defined). Moreover, in the present invention, if a carrier has a direct current subcarrier, a center subcarrier of the carrier is the direct current subcarrier of the carrier or a center frequency of the carrier. If a carrier does not have a direct current subcarrier, a center subcarrier of the carrier is a center frequency of the carrier.

Figure 15A:
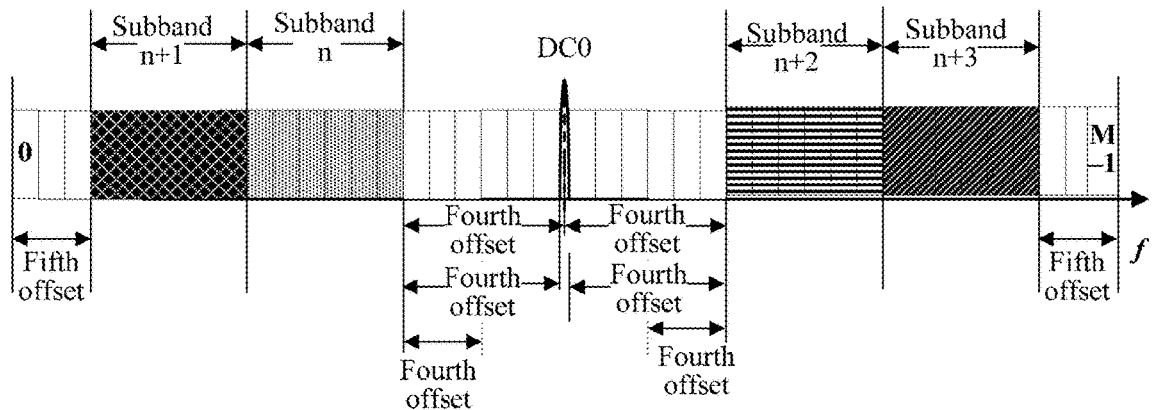
FIG. 15(a) is still yet another schematic diagram of numbering a subband in a method for determining a subband resource according to an embodiment of the present invention.

As shown in FIG. 15(a), the fourth offset indicates an offset between the subband and the center subcarrier of the carrier. The fifth offset indicates an offset between the subband and a particular RB in the carrier (for example, the first RB or the last RB in the carrier).

Figure 15B:
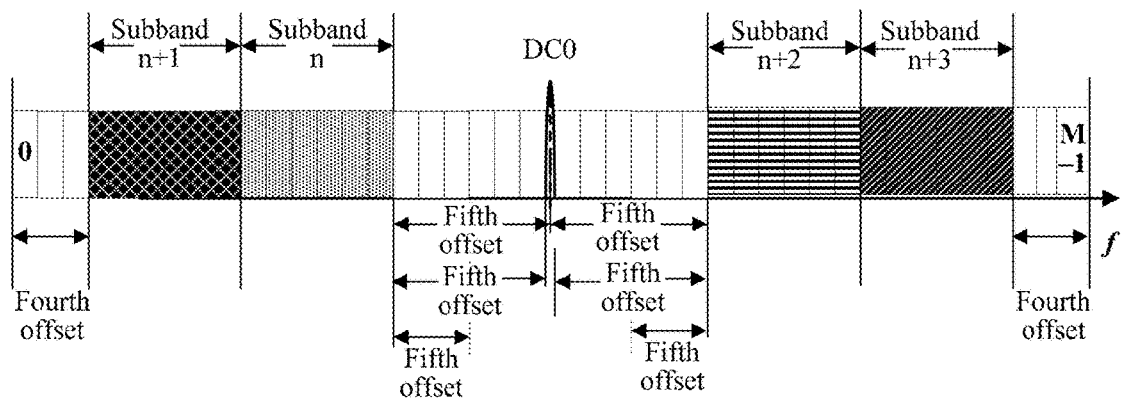
FIG. 15(b) is a further schematic diagram of numbering a subband in a method for determining a subband resource according to an embodiment of the present invention.

Correspondingly, meanings represented by the fourth offset and the fifth offset are interchangeable, as shown in FIG. 15(b).

Figure 15C:
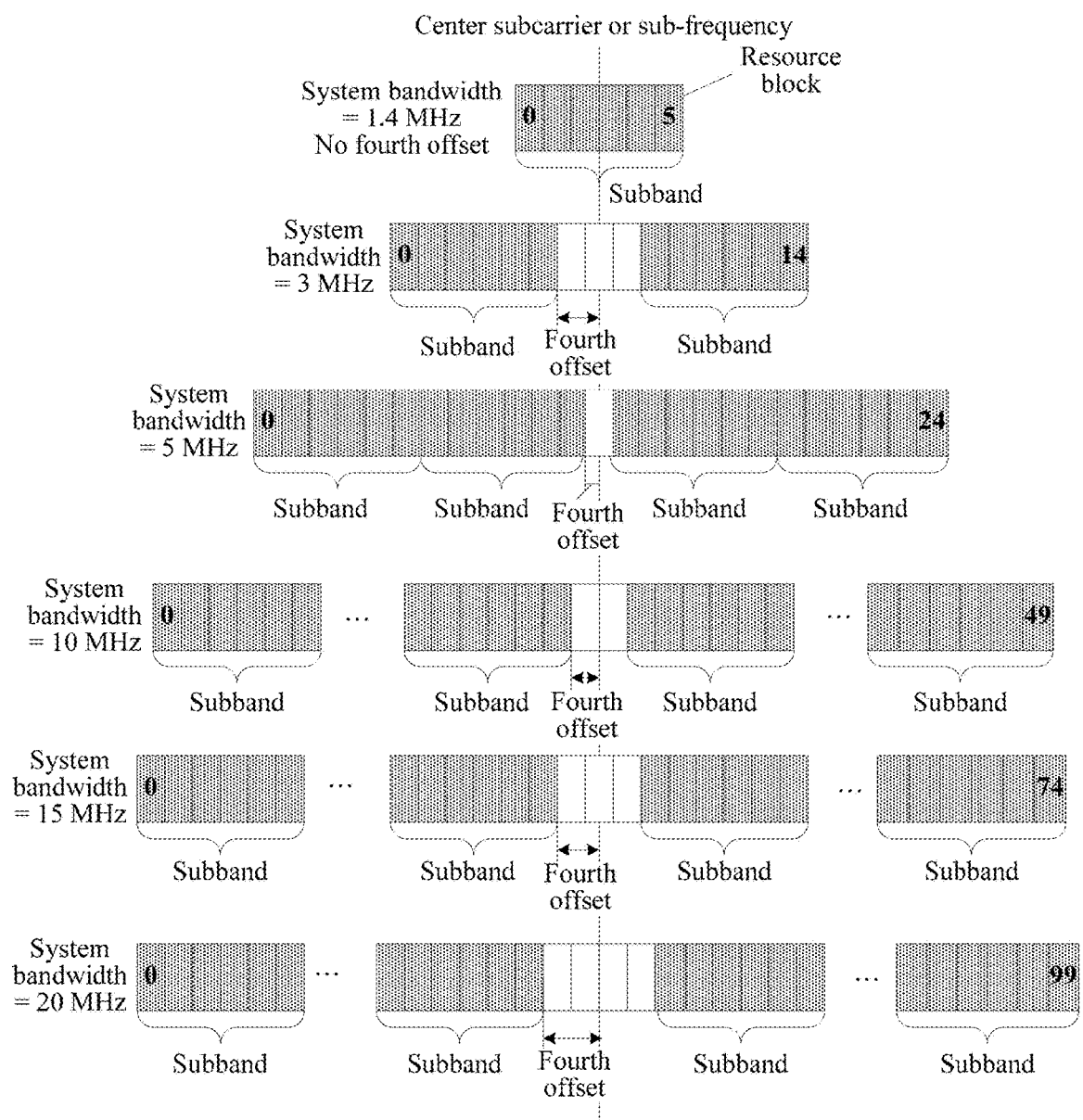
FIG. 15(c) is a schematic diagram of a value of a fourth offset parameter in a method for determining a subband resource according to an embodiment of the present invention.

As shown in FIG. 15(c), FIG. 15(c) shows a value of the fourth offset parameter in a different system bandwidth, and an RB within an offset range (including the left side and the right side of the center subcarrier of the carrier) indicated by the fourth offset does not belong to any subband.

Figure 15D:
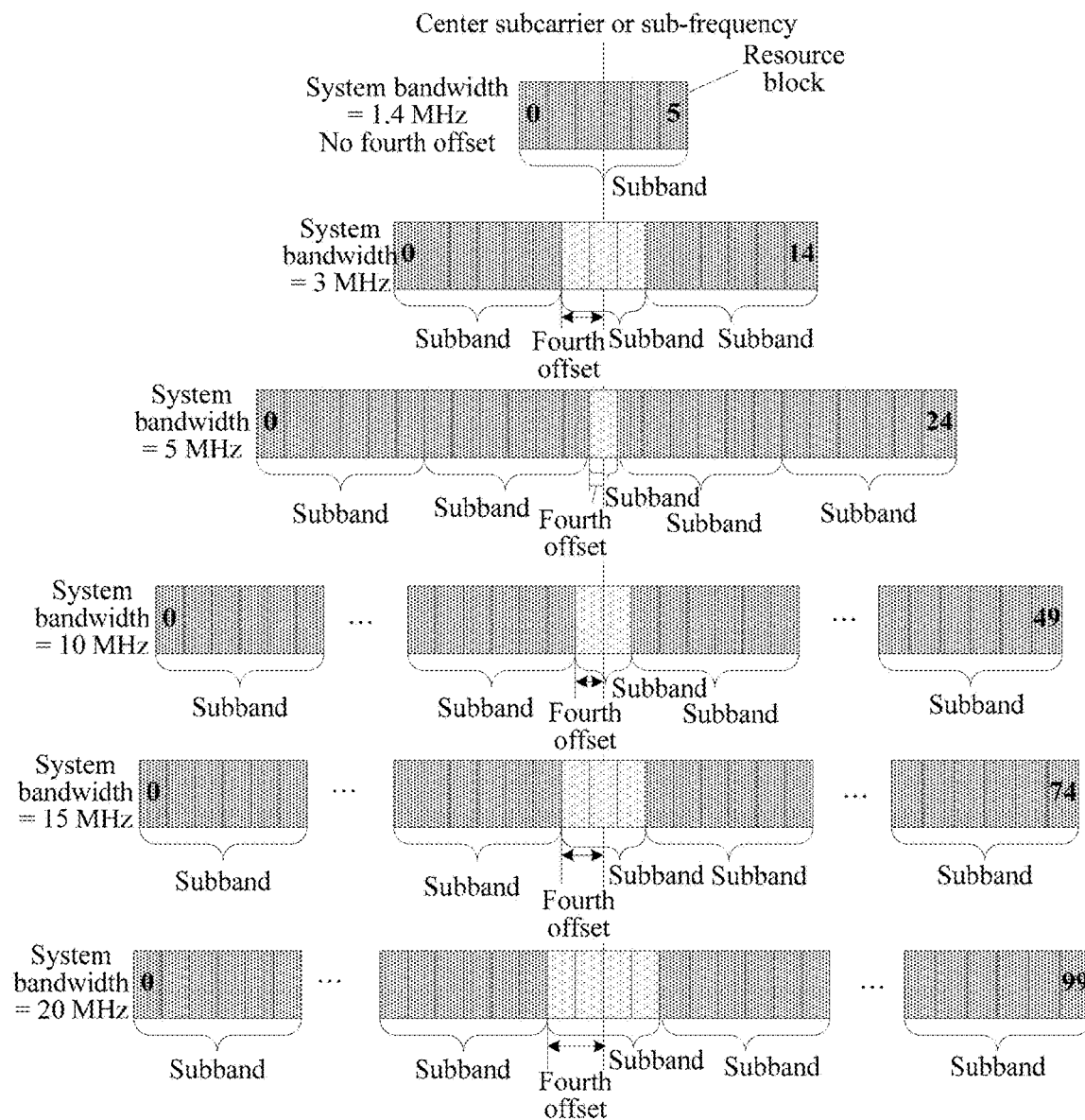
FIG. 15(d) is another schematic diagram of a value of a fourth offset parameter in a method for determining a subband resource according to an embodiment of the present invention.

As shown in FIG. 15(d), FIG. 15(d) shows a value of the fourth offset parameter in a different system bandwidth, and an RB within an offset range (including the left side and the right side of the center subcarrier of the carrier) indicated by the fourth offset forms one subband.

Figure 15E:
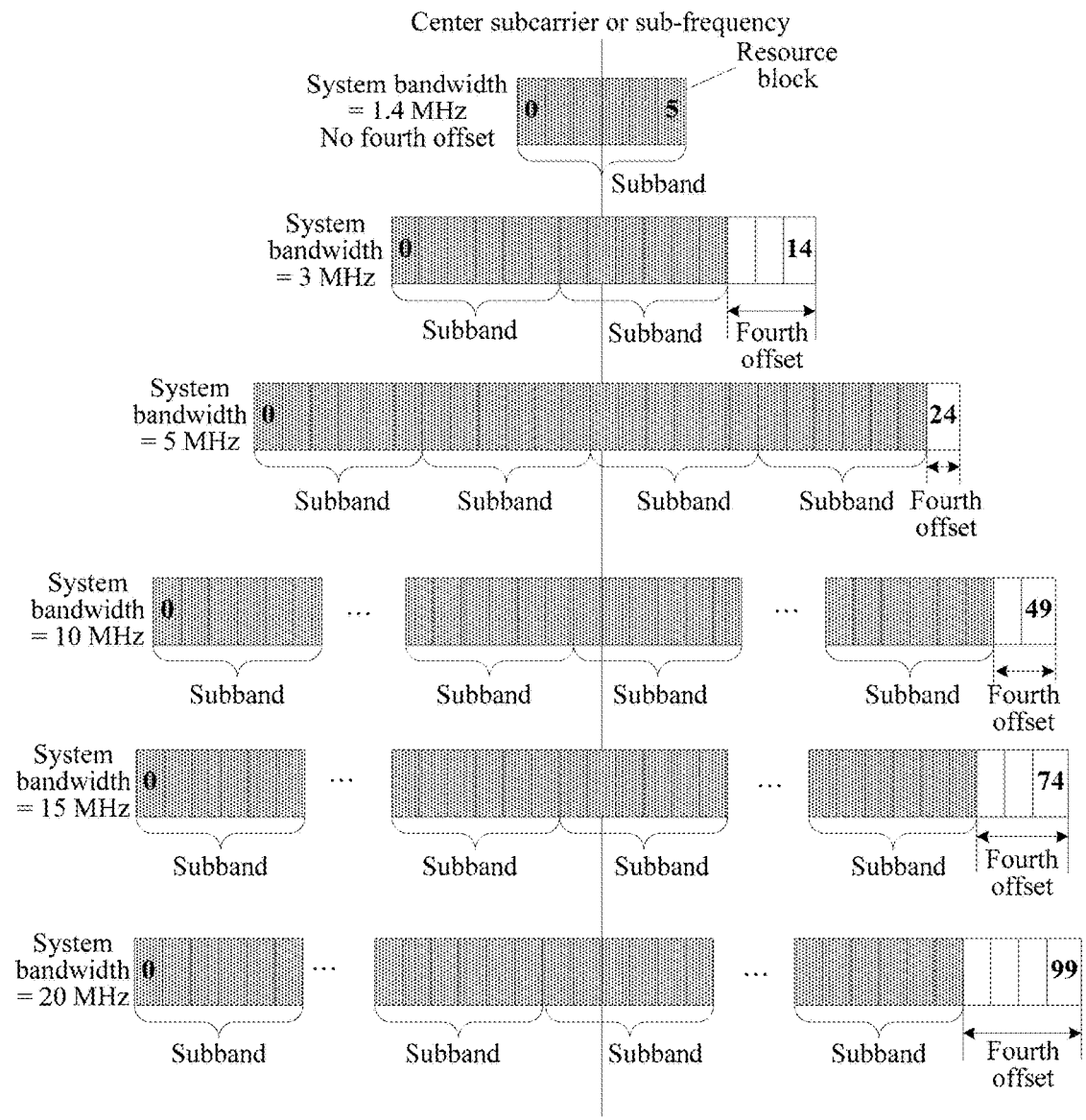
FIG. 15(e) is still another schematic diagram of a value of a fourth offset parameter in a method for determining a subband resource according to an embodiment of the present invention.

As shown in FIG. 15(e), FIG. 15(e) shows a value of the fourth offset parameter in another different system bandwidth, and an RB within an offset range (including the left side and the right side of the center subcarrier of the carrier) indicated by the fourth offset does not belong to any subband.

Further optionally, the subband resource information further includes a sixth offset parameter, where the sixth offset parameter is used to determine the center subcarrier of the subband. Step 902 of determining, by the UE, the subband resource according to the subband resource information includes:

when the subband index is greater than and/or equal to a first threshold, determining, by the UE, the subband resource according to the subband resource information and the sixth offset parameter; or when the subband index is less than a first threshold, determining, by the UE, the subband resource according to the subband resource information and the sixth offset parameter; or when the subband index is an even number, determining, by the UE, the subband resource according to the subband resource information and the sixth offset parameter; or when the subband index is an odd number, determining, by the UE, the subband resource according to the subband resource information and the sixth offset parameter.

The first threshold may be m minus $offset_4$, or the first threshold may be m minus $offset_4$ minus $offset_5$, where m=floor (A/S). Herein, $A=N_{DL}^{RB}$, and $N_{DL}^{RB}$ is a quantity of RBs included in the carrier or the subband. Alternatively, A is a preset integer, floor is a function of rounding down, and S is a fixed constant or a parameter explicitly set by using signaling or an implicitly obtained parameter. For example, S=10.

Pseudo code is used below to describe different methods for determining the center subcarrier of the subband (or determining the subband):

Define that m=floor (A/S).

Define that $N_{RB}^{SC}$ is a quantity of subcarriers included in each RB.

Define a parameter L, where the parameter L may be related to one or more of parameters S or $N_{RB}^{SC}$, or may be related to neither S nor $N_{RB}^{SC}$.

Define that VDC (k) is a subcarrier index of a center subcarrier of a subband k.

Define that $offset_4$ is the fourth offset parameter, define that $offset_5$ is the fifth offset parameter, and define that $offset_6$ is the sixth offset parameter.

Define that k is an index of the subband.

Implementation method 1:

If $k<=m-offset_4$ $$VDC(k)=N_{DL}^{RB} \times (N_{RB}^{SC}/2)-(k+offset_4)\times L$$

Else $$VDC(k)=N_{DL}^{RB} \times (N_{RB}^{SC}/2)+(k-m+2\times offset_4)\times L - offset_6$$

A value of k may be 1, 2, 3, . . . , or $2m-2\times offset_4$.

Implementation method 2:

If $k<=m-offset_4-offset_5$ $$VDC(k)=N_{DL}^{RB} \times (N_{RB}^{SC}/2)-(K+offset_4)\times L$$

Else $$VDC(k)=N_{DL}^{RB} \times (N_{RB}^{SC}/2)+(K-m+2\times offset_4+offset_5)\times L - offset_6$$

A value of k may be 1, 2, 3, . . . , or $2m-2\times offset_4-2\times offset_5$.

Implementation method 3:

If $k<=m-offset_4$ $$VDC(k)=N_{DL}^{RB} \times (N_{RB}^{SC}/2)-(m-K+1-offset_4)\times L$$

Else $$VDC(k)=N_{DL}^{RB} \times (N_{RB}^{SC}/2)+(2m-K+1-2\times offset_4)\times L - offset_6$$

A value of k may be 1, 2, 3, . . . , or $2m-2\times offset_4$.

Implementation method 4:

If $k<=m-offset_4-offset_5$ $$VDC(k)=N_{DL}^{RB} \times (N_{RB}^{SC}/2)-(m-k+1-offset_4)\times L$$

Else $$VDC(k)=N_{DL}^{RB} \times (N_{RB}^{SC}/2)+(2m-k+1-2\times offset_4-offset_5)\times L - offset_6$$

A value of k may be 1, 2, 3, . . . , or $2m-2\times offset_4-2\times offset_5$.

Implementation method 5:

If k mod 2=1

$$VDC(k)=N_{DL}^{RB} \times (N_{RB}^{SC}/2)-(m-ceil(k/2)+1-offset_4)\times L$$

If k mod 2=0

$$VDC(k)=N_{DL}^{RB} \times (N_{RB}^{SC}/2)+(m-k/2+1-offset_4)\times L - offset_6, \text{ or}$$

$$VDC(k)=N_{DL}^{RB} \times (N_{RB}^{SC}/2)-VDC(k-1)$$

where mod is a modulo operation.

Implementation method 6:

If k mod 2=1

$$VDC(k)=N_{DL}^{RB} \times (N_{RB}^{SC}/2)-(m-ceil(K/2)+1-offset_4)\times L$$

If k mod 2=0

$$VDC(k)=N_{DL}^{RB} \times (N_{RB}^{SC}/2)+(m-k/2+1-offset_4)\times L - offset_6, \text{ or}$$

$$VDC(k)=N_{DL}^{RB} \times (N_{RB}^{SC}/2)-VDC(k-1)$$

A value of k may be 1, 2, 3, . . . , or $2m-2\times offset_4-2\times offset_5$.

A standard or a system may specify that one or more methods of the foregoing implementation methods are used to determine a center subcarrier of a subband. For example, the standard specifies that the implementation method 3 or 6 is used to determine a center subcarrier of a subband. Alternatively, the UE determines, by receiving signaling, which implementation method is to be used to determine a center subcarrier of a subband.

Further optionally, in step 901, the UE acquires the subband resource information in two manners.

A first manner: The UE receives second signaling sent by a base station; and acquires the subband resource information from the second signaling.

A second manner: The UE determines the subband resource information in a pre-specified manner.

Further optionally, after step 903, the present invention may further determine a subband resource in another direction.

The UE receives third signaling sent by a base station, where the third signaling indicates a duplex spacing between a downlink subband resource and an uplink subband resource.

When the subband resource is a downlink subband resource, the UE determines an uplink subband resource according to the downlink subband resource and the duplex spacing. When the subband resource is an uplink subband resource, the UE determines a downlink subband resource according to the uplink subband resource and the duplex spacing. If a random access response instructs to determine information about a subband resource occupied for uplink transmission of a message 3, the UE may determine, according to the information about the subband resource, an uplink subband resource for uplink transmission of the message 3. Further, the UE may determine a downlink subband resource for transmission of a contention resolution message (or transmission on a control channel for scheduling a contention resolution message) according to the uplink subband resource and the duplex spacing.

In the present invention, UE acquires subband resource information to determine a subband resource, so that data and/or control information can be transmitted according to the subband resource. In this case, when an operating bandwidth is less than a carrier bandwidth, the UE may determine, by using the subband resource, that a particular frequency bandwidth size bandwidth in a bandwidth is a bandwidth for sending or receiving data related to the UE, so that the user equipment can communicate with a base station while costs of the UE or complexity of the UE is reduced.

Figure 16:
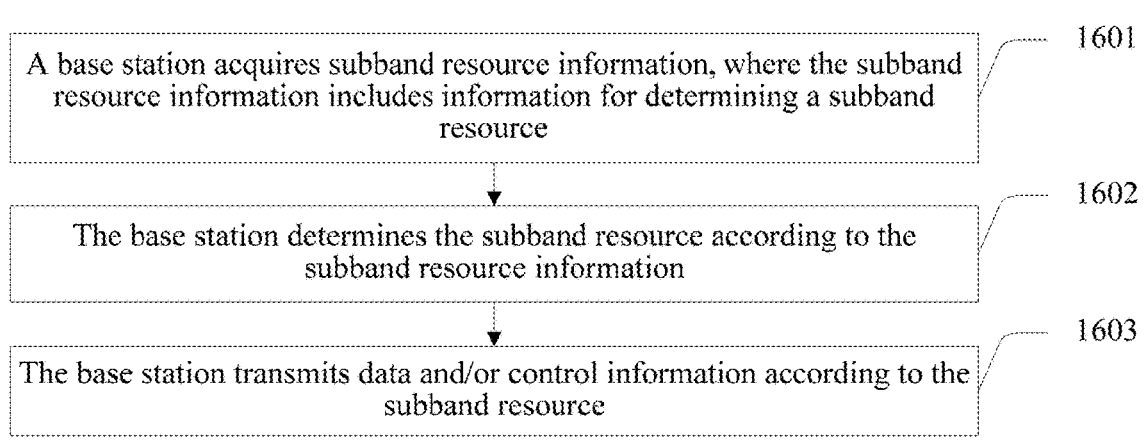
FIG. 16 is a flowchart of another method for determining a subband resource according to an embodiment of the present invention.

Correspondingly, on a hotspot side of a communications system, the present invention may further provide a method for determining a subband resource. As shown in FIG. 16, the method is applied to a base station. A subband resource in the method is a resource in a subband. The subband is a frequency resource that is in a bandwidth and that has an operating bandwidth. The bandwidth is a downlink bandwidth or an uplink bandwidth. The operating bandwidth is less than the bandwidth. Details are as follows:

1601: The base station acquires subband resource information, where the subband resource information includes information for determining the subband resource.

1602: The base station determines the subband resource according to the subband resource information.

1603: The base station transmits data and/or control information according to the subband resource.

The present invention provides the method for determining a subband resource. Compared with a problem in the prior art that communication between low-complexity UE and a base station is impeded because the low-complexity UE can only send or receive data within an operating bandwidth on a carrier, and the low-complexity UE cannot know which operating bandwidth size bandwidth in a bandwidth is a bandwidth used to transmit data related to the low-complexity UE, in the present invention, a base station acquires subband resource information to determine a subband resource, so that data and/or control information can be transmitted according to the subband resource. In this case, when an operating bandwidth is less than a carrier bandwidth, the base station may determine, by using a subband resource, that a particular frequency bandwidth size bandwidth in a bandwidth is a bandwidth for sending or receiving data related to the UE, so that the user equipment can communicate with the base station while costs of the UE or complexity of the UE is reduced.

It should be noted that the subband resource is the subband, or the subband resource is a center subcarrier of the subband.

Further, the subband resource information in step 1601 may include particular frequency information and a first offset parameter, where the particular frequency information is used to determine the center subcarrier of the subband, and the first offset parameter is used to determine an offset of the center subcarrier of the subband.

Alternatively, the subband resource information includes a first parameter and a second parameter, where the first parameter is used to determine a location of the center subcarrier of the subband in a resource block RB, and the second parameter is used to determine the resource block RB in which the center subcarrier of the subband is located.

Alternatively, the subband resource information includes a subband determining manner and a subband index, where the subband determining manner specifies a formation manner of the subband in the bandwidth, and the subband index is a number of the subband in the bandwidth.

The particular frequency information is one or more of a center frequency of a center subcarrier of a carrier, a center subcarrier of a carrier, a subcarrier index of a center subcarrier of a carrier, a particular subcarrier of a carrier, an index of a particular subcarrier of a carrier, a particular resource block in a carrier, an index of a particular resource block in a carrier, a particular frequency in a carrier, a location of a particular frequency in a carrier, or a particular frequency resource in a carrier.

The first offset parameter indicates one or more of a subcarrier quantity of a first offset, a value of a frequency of a first offset, or a resource block quantity of a first offset.

In addition, it should be noted that for detailed descriptions of the particular frequency information, the first offset parameter, the first parameter, the second parameter, the subband determining manner, and the subband index, refer to the descriptions in the foregoing drawings (FIG. 2 to FIG. 15(*e*)), and details are not described one by one herein.

Further optionally, when a quantity of resource blocks included in the bandwidth is an odd number, and the subband resource information includes the particular frequency information and the first offset parameter, the subband resource information further includes a second offset parameter, where the second offset parameter indicates that a second offset is N subcarriers or a frequency resource width of N subcarriers, and N is an integer not equal to 0.

Step 1602 of determining, by the base station, the subband resource according to the subband resource information includes: determining, by the base station, the subband resource according to the particular frequency information, the first offset parameter, and the second offset parameter.

Further optionally, before step 1602, the method further includes:

generating, by the base station, used to indicate a first particular manner of determining the subband resource by using the particular frequency information and the first offset, and/or generating, used to indicate a second particular manner of determining the subband resource by using the particular frequency information, the first offset, and the second offset, where the first particular manner is an addition manner or a subtraction manner, and the second particular manner is an addition manner or a subtraction manner, so that the base station determines the subband resource according to the subband resource information, the first particular manner, and/or the second particular manner.

In addition, the base station generates first signaling, where the first signaling indicates the first particular manner and/or the second particular manner; and sends the first signaling to UE.

Further optionally, when the subband resource information includes the first parameter and the second parameter, the subband resource information further includes a third offset parameter, where the third offset parameter is used to determine the offset of the center subcarrier of the subband. Step 1602 may include: determining, by the base station, the subband resource according to the first parameter, the second parameter, and the third offset parameter.

Further optionally, when the subband resource information includes the subband determining manner and the subband index, for the subband determining manner, a subband determining manner 1 or a subband determining manner 2 is used.

The subband determining manner 1: The base station numbers subbands starting from one side of a center subcarrier of a carrier, and after the numbering on all subbands on the side of the center subcarrier of the carrier is completed, numbers subbands from the other side of the center subcarrier of the carrier.

For example, all subbands located on the left side of the center subcarrier of the carrier (that is, a frequency resource whose frequency is less than a frequency of the center subcarrier of the carrier) of the subband resource are numbered in a sequence from a lower frequency to a higher frequency, and then all unnumbered subbands located on the right side of the center subcarrier of the carrier (that is, a frequency resource whose frequency is greater than a frequency of the center subcarrier of the carrier) of the subband resource are numbered in a sequence from a lower frequency to a higher frequency.

For another example, all subbands located on the right side of the center subcarrier of the carrier (that is, a frequency resource whose frequency is greater than a frequency of the center subcarrier of the carrier) of the subband resource are numbered in a sequence from a higher frequency to a lower frequency, and then all unnumbered subbands located on the left side of the center subcarrier of the carrier (that is, a frequency resource whose frequency is less than a frequency of the center subcarrier of the carrier) of the subband resource are numbered in a sequence from a higher frequency to a lower frequency.

The subband determining manner 2: The base station numbers subbands starting from one side of a center subcarrier of a carrier, after numbering on one subband is completed, numbers subbands from the other side of the center subcarrier of the carrier, after numbering on one subband of the carrier and numbers remaining subbands on the side, and after numbering on one subband is completed, returns to to the other side of the center subcarrier of the carrier and numbers remaining subbands on the other side, until numbering on all subbands on both sides of the center subcarrier of the carrier is completed.

Optionally, for any subband determining manner, if subband resources of a subband are located on two sides of the center subcarrier of the carrier, the subband is referred to as a center subband. If subband resources of a subband are not located on two sides of the center subcarrier of the carrier, the subband is referred to as a non-center subband. The center subband may be used as a first subband (that is, numbered 0), or may be numbered as a last subband, or is numbered by using a same method as a non-center subband, or is used as a default subband. The default subband is numbered 0, or the default subband does not participate in the numbering of subbands.

Further optionally, when the subband resource information includes a subband determining manner and a subband index, the subband resource information further includes a fourth offset parameter and/or a fifth offset parameter, where the fourth offset parameter is used to determine an offset of the subband, and the fifth offset parameter is used to determine the offset of the subband.

Step 1602 includes: determining, by the base station, the subband resource according to the subband determining manner, the subband index, and the fourth offset parameter; or determining, by the base station, the subband resource according to the subband determining manner, the subband index, and the fifth offset parameter; or determining, by the base station, the subband resource according to the subband determining manner, the subband index, the fourth offset parameter, and the fifth offset parameter.

In this embodiment of the present invention, a fixed value of the fourth offset parameter may be set in advance according to a system bandwidth.

For example, a manner of determining the value is:

when the system bandwidth is 1.4 MHz, the fourth offset is 0; and/or when the system bandwidth is 3 MHz, the fourth offset is 1.5 RBs; and/or when the system bandwidth is 5 MHz, the fourth offset is 0.5 RB; and/or when the system bandwidth is 10 MHz, the fourth offset is 1 RB; and/or when the system bandwidth is 15 MHz, the fourth offset is 1.5 RBs; and/or when the system bandwidth is 20 MHz, the fourth offset is 2 RBs.

Another manner of determining the value is:

when the system bandwidth is 1.4 MHz, the fourth offset is 0; and/or when the system bandwidth is 3 MHz, the fourth offset on the left side (or right side) of the center subcarrier of the carrier is 0, and the fourth offset on the right side (or left side) of the center subcarrier of the carrier is 3 RBs; and/or when the system bandwidth is 5 MHz, the fourth offset on the left side (or right side) of the center subcarrier of the carrier is 0, and the fourth offset on the right side (or left side) of the center subcarrier of the carrier is 1 RB; and/or when the system bandwidth is 10 MHz, the fourth offset on the left side (or right side) of the center subcarrier of the carrier is 0, and the fourth offset on the right side (or left side) of the center subcarrier of the carrier is 2 RBs; and/or when the system bandwidth is 15 MHz, the fourth offset on the left side (or right side) of the center subcarrier of the carrier is 0, and the fourth offset on the right side (or left side) of the center subcarrier of the carrier is 3 RBs; and/or when the system bandwidth is 20 MHz, the fourth offset on the left side (or right side) of the center subcarrier of the carrier is 0, and the fourth offset on the right side (or left side) of the center subcarrier of the carrier is 4 RBs.

Optionally, an RB within an offset range (including the left side and the right side of the center subcarrier of the carrier) indicated by the fourth offset does not belong to any subband.

Optionally, an RB within an offset range (including the left side and the right side of the center subcarrier of the carrier) indicated by the fourth offset may form a special subband (a quantity of RBs included in the special subband is less than a quantity of RBs included in the subband).

Optionally, for a first system bandwidth set, an RB within an offset range (including the left side and the right side of the center subcarrier of the carrier) indicated by the fourth offset may form a special subband. For a second system bandwidth set, an RB within an offset range (including the left side and the right side of the center subcarrier of the carrier) indicated by the fourth offset does not belong to any subband. A bandwidth included in the first system bandwidth set is different from a bandwidth included in the second system bandwidth set. For example, the first system bandwidth set includes system bandwidths of 3 MHz, 5 MHz, 10 MHz, 15 MHz, and 20 MHz, and the second system bandwidth set includes a system bandwidth of 1.4 MHz.

When the system bandwidth is 1.4 MHz, there is no special subband;

when the system bandwidth is 3 MHz, the special subband includes three RBs;

when the system bandwidth is 5 MHz, the special subband includes one RB;

when the system bandwidth is 10 MHz, the special subband includes two RBs;

when the system bandwidth is 15 MHz, the special subband includes three RBs; and when the system bandwidth is 20 MHz, the special subband includes four RBs.

For another example, the first system bandwidth set includes system bandwidths of 5 MHz, 10 MHz, 15 MHz, and 20 MHz, and the second system bandwidth set includes system bandwidths of 1.4 MHz and 3 MHz.

Optionally, the fifth offset is 0. When the determined subband is a downlink subband, the fifth offset is equal to 0. When the determined subband is an uplink subband, a value of the fifth offset is set by using higher layer signaling.

It should be noted that in the present invention, if a value of an offset parameter is constantly 0, it indicates that such an offset parameter does not exist or does not need to be introduced (or defined). Moreover, in the present invention, if a carrier has a direct current subcarrier, a center subcarrier of the carrier is the direct current subcarrier of the carrier or a center frequency of the carrier. If a carrier does not have a direct current subcarrier, a center subcarrier of the carrier is a center frequency of the carrier.

Further optionally, when the subband resource information includes a subband determining manner and a subband index, the subband resource information further includes a sixth offset parameter, where the sixth offset parameter is used to determine the center subcarrier of the subband, and step 1602 includes:

when the subband index is greater than and/or equal to a first threshold, determining, by the base station, the subband resource according to the subband resource information and the sixth offset parameter; or when the subband index is less than a first threshold, determining, by the base station, the subband resource according to the subband resource information and the sixth offset parameter; or when the subband index is an even number, determining, by the base station, the subband resource according to the subband resource information and the sixth offset parameter; or when the subband index is an odd number, determining, by the base station, the subband resource according to the subband resource information and the sixth offset parameter.

Further optionally, when the subband resource is the subband, and when the subband includes 2M+2 subcarriers, using an example in which one subcarrier of the subband is used as the center subcarrier of the subband, the subband resource includes: the center subcarrier of the subband, M subcarriers whose frequency is less than a frequency of the center subcarrier of the subband, and M+1 subcarriers whose frequency is greater than the frequency of the center subcarrier of the subband; or the center subcarrier of the subband, M+1 subcarriers whose frequency is less than a frequency of the center subcarrier of the subband, and M subcarriers whose frequency is greater than the frequency of the center subcarrier of the subband.

Using an example in which two subcarriers of the subband are used as center subcarriers of the subband, the subband resource includes: the center subcarriers of the subband, M subcarriers whose frequency is less than a frequency of a center subcarrier of the subband, and M subcarriers whose frequency is greater than the frequency of the center subcarrier of the subband.

Further optionally, a manner of acquiring, by the base station, subband resource information in step 1601 includes:

A first manner: The base station generates the subband resource information. A second manner: The base station determines the subband resource information in a pre-specified manner. Correspondingly, after the base station acquires the subband resource information, the base station sends, to the UE, second signaling carrying the subband resource information.

Further optionally, after the base station determines the subband resource according to the subband resource information, the method further includes:

determining, by the base station, a duplex spacing between a downlink subband resource and an uplink subband resource; and sending, to the UE, third signaling carrying the duplex spacing; when the subband resource is a downlink subband resource, determining, by the base station, an uplink subband resource according to the downlink subband resource and the duplex spacing; or when the subband resource is an uplink subband resource, determining, by the base station, a downlink subband resource according to the downlink subband resource and the duplex spacing.

In the present invention, a base station acquires subband resource information to determine a subband resource, so that data and/or control information can be transmitted according to the subband resource. In this case, when an operating bandwidth is less than a carrier bandwidth, the base station may determine, by using a subband resource, that a particular frequency bandwidth size bandwidth in a bandwidth is a bandwidth for sending or receiving data related to UE, so that the user equipment can communicate with the base station while costs of the UE or complexity of the UE is reduced.

It may be clearly understood by a person skilled in the art that, for a purpose of convenient and brief description, only the foregoing functional module division is used as an example for description. In an actual application, the foregoing functions are assigned to different functional modules for implementation as required, that is, an inner structure of the apparatus is divided into different functional modules to implement all or some of the functions described above. For a detailed working process of the foregoing system, apparatus, and unit, refer to a corresponding process in the foregoing method embodiments, and details are not described herein.

In the several embodiments provided in the present application, it should be understood that the disclosed system, apparatus, and method may be implemented in other manners. For example, the described apparatus embodiment is only exemplary. For example, the module or unit division is only logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one location, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are only specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for determining a subband, implemented by an apparatus which is associated with a user equipment (UE), wherein the subband is a frequency resource that is in a bandwidth and has an operating bandwidth and comprises at least one resource block, wherein the bandwidth is a downlink bandwidth or an uplink bandwidth, and wherein the subband has less bandwidth than either the downlink bandwidth or the uplink bandwidth, the method comprising:
    acquiring a subband information, wherein the subband information comprises information for determining the subband;
    determining the subband according to the subband information; and
    transmitting at least one of (a) data and (b) control information according to the subband to a base station;
    wherein the subband information comprises:
        a subband determining manner; and
        a subband index,
        wherein the subband determining manner comprises numbering subbands starting from one side of a center subcarrier of a carrier, and after the numbering on available subbands on the side of the center subcarrier of the carrier is completed, numbering subbands from the other side of the center subcarrier of the carrier, and the subband index indicates a number of subbands comprised in the bandwidth,
    wherein the subband information further comprises at least one of the group consisting of: a fourth offset parameter used to determine an offset between a subband and the center subcarrier of the carrier, and a fifth offset parameter used to determine an offset between a subband and a first resource block or a last resource block in the carrier, and
    wherein the determining the subband according to the subband information comprises determining the subband according to at least:
        the subband determining manner,
        the subband index, and
        at least one of the group consisting of: the fourth offset parameter, and the fifth offset parameter.

2. The method according to claim 1,
    wherein the subband information further comprises a sixth offset parameter, and
    wherein, when the subband index is greater than or equal to a first threshold, the sixth offset parameter is used to determine the center subcarrier of the subband.

3. The method according to claim 1, further comprising: receiving second signaling sent by a base station; and acquiring the subband information from the second signaling.

4. A method for determining a subband, implemented by an apparatus which is associated with a base station, wherein the subband is a frequency resource that is in a bandwidth and has an operating bandwidth and comprises at least one resource block, wherein the bandwidth is a downlink bandwidth or an uplink bandwidth, and wherein the subband has less bandwidth than either the downlink bandwidth or the uplink bandwidth, the method comprising:
    acquiring subband information, wherein the subband information comprises information for determining the subband;
    determining the subband according to the subband information; and transmitting at least one of (a) data and (b) control information according to the subband to a user equipment;
wherein the subband information comprises:
a subband determining manner; and
a subband index,
wherein the subband determining manner comprises numbering subbands starting from one side of a center subcarrier of a carrier, and after the numbering on available subbands on the side of the center subcarrier of the carrier is completed, numbering subbands from the other side of the center subcarrier of the carrier, and the subband index indicates a number of subbands comprised in the bandwidth,
wherein the subband information further comprises at least one of the group consisting of: a fourth offset parameter used to determine an offset between a subband and the center subcarrier of the carrier, and a fifth offset parameter used to determine an offset between a subband and a first resource block or a last resource block in the carrier, and
wherein the determining the subband according to the subband information comprises determining the subband according to at least:
the subband determining manner,
the subband index, and
at least one of the group consisting of: the fourth offset parameter, and the fifth offset parameter.

5. The method according to claim 4,
wherein the subband information further comprises a sixth offset parameter, and
wherein, when the subband index is greater than or equal to a first threshold, the sixth offset parameter is used to determine the center subcarrier of the subband.

6. The method according to claim 4, further comprising:
generating the subband information;
determining the subband information in a pre-specified manner; and
sending, to a user equipment (UE), second signaling carrying the subband information.

7. An apparatus comprising:
a processor; and
a non-transitory computer-readable medium comprising computer-executable instructions that, when executed by the processor, facilitate carrying out a method for determining a subband, wherein the apparatus is associated with a user equipment (UE), wherein the subband is a frequency resource that is in a bandwidth and has an operating bandwidth and comprises at least one resource block, wherein the bandwidth is a downlink bandwidth or an uplink bandwidth, and wherein the subband has less bandwidth than either the downlink bandwidth or the uplink bandwidth, the method comprising:
acquiring a subband information, wherein the subband information comprises information for determining the subband;
determining the subband according to the subband information; and
transmitting at least one of (a) data and (b) control information according to the subband to a base station;
wherein the subband information comprises:
a subband determining manner; and
a subband index,
wherein the subband determining manner comprises numbering subbands starting from one side of a center subcarrier of a carrier, and after the numbering on available subbands on the side of the center subcarrier of the carrier is completed, numbering subbands from the other side of the center subcarrier of the carrier, and the subband index indicates a number of subbands comprised in the bandwidth,
wherein the subband information further comprises at least one of the group consisting of: a fourth offset parameter used to determine an offset between a subband and the center subcarrier of the carrier, and a fifth offset parameter used to determine an offset between a subband and a first resource block or a last resource block in the carrier, and
wherein the determining the subband according to the subband information comprises determining the subband according to at least:
the subband determining manner,
the subband index, and
at least one of the group consisting of: the fourth offset parameter, and the fifth offset parameter.

8. The apparatus according to claim 7,
wherein the subband information further comprises a sixth offset parameter, and
wherein, when the subband index is greater than or equal to a first threshold, the sixth offset parameter is used to determine the center subcarrier of the subband.

9. The apparatus according to claim 7, wherein
receiving a second signaling sent by a base station; and
acquiring the subband information from the second signaling.

10. An apparatus comprising:
a processor; and
a non-transitory computer-readable medium comprising computer-executable instructions that, when executed by the processor, facilitate carrying out a method for determining a subband, wherein the apparatus is associated with a base station, wherein the subband is a frequency resource that is in a bandwidth and has an operating bandwidth and comprises at least one resource block, wherein the bandwidth is a downlink bandwidth or an uplink bandwidth, and wherein the subband has less bandwidth than either the downlink bandwidth or the uplink bandwidth, the method comprising:
acquiring a subband information, wherein the subband information comprises information for determining the subband;
determining the subband according to the subband information; and
transmitting at least one of (a) data and (b) control information according to the subband to a user equipment;
wherein the subband information comprises:
a subband determining manner; and
a subband index,
wherein the subband determining manner comprises numbering subbands starting from one side of a center subcarrier of a carrier, and after the numbering on available subbands on the side of the center subcarrier of the carrier is completed, numbering subbands from the other side of the center subcarrier of the carrier, and the subband index indicates a number of subbands comprised in the bandwidth,
wherein the subband information further comprises at least one of the group consisting of: a fourth offset parameter used to determine an offset between a subband and the center subcarrier of the carrier, and a fifth offset parameter used to determine an offset between a subband and a first resource block or a last resource block in the carrier, and wherein the determining the subband according to the subband information comprises determining the subband according to at least:
the subband determining manner,
the subband index, and
at least one of the group consisting of: the fourth offset parameter, and the fifth offset parameter.

11. The apparatus according to claim 10,
wherein the subband information further comprises a sixth offset parameter, and
wherein, when the subband index is greater than or equal to a first threshold, the sixth offset parameter is used to determine the center subcarrier of the subband.

12. The apparatus according to claim 10, wherein the method further comprises:
generating the subband information; and
determining the subband information in a pre-specified manner; and
sending, to a user equipment (UE), a second signaling carrying the subband information.

* * * * *